(12) United States Patent
Lowry et al.

(10) Patent No.: US 12,321,874 B2
(45) Date of Patent: Jun. 3, 2025

(54) SYSTEM OF STANDARDIZED API INTERPRETATION FOR INTER APPLICATION COMMUNICATION

(71) Applicant: THEPOWERTOOL PTY LTD, Nerang (AU)

(72) Inventors: Peter Lowry, Nerang (AU); Jeff Butterworth, Nerang (AU); John Lowry, Nerang (AU)

(73) Assignee: THEPOWERTOOL PTY LTD, Nerang (AU)

( * ) Notice: Subject to any disclaimer, the term of this patent is extended or adjusted under 35 U.S.C. 154(b) by 0 days.

(21) Appl. No.: 17/549,007

(22) Filed: Dec. 13, 2021

(65) Prior Publication Data

US 2022/0172149 A1 Jun. 2, 2022

Related U.S. Application Data

(63) Continuation of application No. 15/557,823, filed as application No. PCT/AU2016/000082 on Mar. 11, 2016, now abandoned.

(30) Foreign Application Priority Data

Mar. 13, 2015 (AU) ................. 2015900914

(51) Int. Cl.
*G06Q 10/0631* (2023.01)
*G06F 9/54* (2006.01)
(Continued)

(52) U.S. Cl.
CPC ..... *G06Q 10/063118* (2013.01); *G06F 9/543* (2013.01); *G06Q 10/06* (2013.01); *G06Q 10/06316* (2013.01); *G06Q 10/0633* (2013.01)

(58) Field of Classification Search
CPC ............. G06Q 10/06; G06Q 10/06316; G06Q 10/063118; G06Q 10/0633; G06F 9/543
See application file for complete search history.

(56) References Cited

U.S. PATENT DOCUMENTS

| 8,893,077 B1 * | 11/2014 | Aiuto | ............ G06F 8/36 717/106 |
| 2009/0031006 A1 * | 1/2009 | Johnson | ............ H04M 3/42348 709/218 |

(Continued)

OTHER PUBLICATIONS

Xie, H. (2005). User model-driven architecture for information retrieval in construction project management (Order No. 3178054). Available from ProQuest Dissertations and Theses Professional. (304995939). (Year: 2005).*

*Primary Examiner* — William S Brockington, III
(74) *Attorney, Agent, or Firm* — Hayes Soloway P.C.

(57) ABSTRACT

A method for intuitive system building includes accessing a processor through a user interface to execute a program, wherein the program is stored on a memory device connected to the processor, creating projects and tasks, setting up processes within a task, setting security for personnel, giving access rights and privileges to individual accounts, and accessing a generic API library for integrating software, executing instructions through the processor whereby the projects and tasks are set as a tree structure for intuitive system building, executing instructions through the processor by giving approved personnel an ability through the user interface to create a set of forms to deploy through a task to the personnel to facilitate individualized processes, executing instructions through the processor whereby the security for personnel is set by role and the user interface applies a global set of rules over roles where read/write, edit and viewing capabilities are set.

4 Claims, 13 Drawing Sheets

(51) Int. Cl.
*G06Q 10/06* (2023.01)
*G06Q 10/0633* (2023.01)

(56) References Cited

U.S. PATENT DOCUMENTS

2012/0110087 A1\* 5/2012 Culver ................. G06Q 20/123
709/205
2015/0312324 A1\* 10/2015 Filev ..................... G06F 3/0481
715/744

\* cited by examiner

SYSTEM OF STANDARDIZED API INTERPRETATION FOR INTER APPLICATION COMMUNICATION

CROSS-REFERENCE TO RELATED APPLICATIONS AND PRIORITY

This patent application is a Continuation of U.S. patent application Ser. No. 15/557,823 filed Sep. 13, 2017 which claims priority from PCT Patent Application No. PCT/AU2016/000082 filed Mar. 11, 2016, which claims priority from Australian Patent Application No. 2015900914 filed Mar. 13, 2015. Each of these patent applications are herein incorporated by reference in their entirety.

FIELD OF THE INVENTION

The present invention relates to a communications matrix network architecture. The system connects and combines communications between software as a service (SaaS) web services, bespoke on-site software services (IT platforms), operational technology services (OT systems), web connected sensors, and personnel communications including mobile devices (the systems). It establishes relationships between all connected services and personnel in a mutual and hierarchical project and task based architecture, Managed Inter Application Communications (MIAC). The system retains the connected systems integrity and individuality whilst still allowing them to integrate and communicate on a central platform.

BACKGROUND

Discussion of Different Patents Similar to but Different to this Patent:
Project Management Database and Method of Managing Project Related Information US 20110231391 A1
This patent is not a task and project based software that includes a workforce or personnel. It uses the terminology 'project' to describe a project being carried out by a project management system separate to the invention. This invention is a method of processing and managing data from one source to another. A user interface is supplied to help with the conversion from one data type to another and makes it available as an accessible document in a standard format where the user interface is used to make the data available to the user or users. The difference between the two systems is quite clear. Where a project resides in a separate system in US 20110231391 A1, in the MIAC system a project is set up within the system via a user interface to facilitate single or multiple tasks that relate to the project. A project is assigned a unique ID and has a set of governing rules applied in subsequent data tables such as user codes, project parents for projects that are created under another higher level project in a hierarchy, organisations and user code organisation ID numbers. This allows a project in MIAC to direct relevant task information, task communications and task alerts to both internal and external personnel as desired by and set up by an administrator. A project can have numerous tasks all doing different things from data transactions and process workflows to free form communications where as in US 20110231391 A1 it is concerned with the transaction of data only. Because the MIAC system includes the ability to create any given workflow, it can combine data transactions, manual processes, schedule tasks, escalate actions within a task workflow, allow free form communication and record all actions and communications within the task where housed under a project for audit capabilities.
Federation for Information Technology Service Management
WO 2013019241 A1
In this patent the author describes the system as a single point access to autonomous software. The patent delivers the ability create visibility to multiple autonomous systems from one portal. An integration layer is achieved by providing a federation or service bus to create integrated data solutions. Integration is restricted to northbound and southbound data transactions. They do not include the ability to integrate with a workforce, escalate tasks which have not been seen or actioned other than in a notification capability from the systems it connects.
Information Technology System Collaboration
U.S. Pat. No. 8,601,068 B2
In this invention the author describes the ability of the system to allow collaboration between people from different areas of interest within a single data set. It allows the parties involved to communicate and be identified to be provided access to the collaborative mechanism of the invention. This system requires parties to be provided access when new topics are raised. Where this invention is an event driven collaborative platform the MIAC invention is a workflow platform that also has the ability to be a collaborative platform in its own right whether driven by an event or not. The MIAC system is event driven but handles events in a number of different ways prior to becoming a collaborative personnel effort. The MIAC system manages and facilitates the collection of data from one system or source and deposits the data into a subsequent system or systems. On success the system can be set to notify any number of associated parties or just complete and close a task automatically if the transaction is successful. On failure the notification element of the system can notify the origin, destination personnel and become a collaboration effort. If the task is not performed in time or is missed by a person, the system can be set to escalate the task to higher management personnel and can repeat the process to the top level management or system. Tasks can also be assigned to appropriate personnel within the system to complete workflows and collaboration can take place at any point along the workflow. All collaborations, assignments and transactional details are recorded and displayed within the task.
Presence Aware Notification for Information Technology Management
U.S. Pat. No. 8,671,146 B2
This invention is a system where a monitor is loaded to various software to monitor activity. The monitor relays event code with details to a single or multiple people via a personnel management user interface as a notification or alert. The receiver of the information can then contact the origin system for IT management purposes. The IT manager can use the signal to contact an available user to rectify a problem. This system is also an event driven IT management system is does not perform the same function as the MIAC system. The MIAC system can be set to perform similar functionality it relies on the transaction success and failure of an action to trigger an alert or alarm to personnel. The obvious difference is that this is an IT management system for when IT systems fail and not and action driven platform like MIAC where the success or failure of an action create a task to be performed. The MIAC system includes all relevant personnel from workers on the floor who perform manual tasks within a workflow to IT personnel who are required to participate in different levels of the workflow.

Adaptive Enterprise Service Bus (ESB) Runtime System and Method
U.S. Pat. No. 8,570,905 B2

This invention is a processor that adapts to enterprise service bus models to and provides multiple pathways, a server that executes data across the pathways, a monitor collecting metrics, a analyser receiving metrics and analysing metrics collected and a further processor to execute data across a preferred path established by the first processor.

This system is a service bus made-easy product and cost-benefit tool. It does not include any personnel or workflow capabilities in the same way MIAC does. MIAC would be able to API into this product to create the communications between personnel and create workflow processes as an extension to what this invention does.

Protocol for Enabling Dynamic and Scalable Federation of Enterprise Service Buses
U.S. Pat. No. 8,095,670 B2

This invention is a method of connecting enterprise service bus (ESB) nodes to other ESB nodes in a federation (plurality of ESBs) across a proxy to create an ESB federation where portions of multiple ESBs can be linked to create one ESB federation. This invention is concerned with pathways and make routing decisions based on routing/management protocols. It has the ability to deliver meta data to a single or multiple ESBs as appropriate under defined business policies.

ESBs work by creating pathways between IT solutions via nodes and are a system to system approach to automation between systems. The MIAC system is not an ESB and will have application to ESB subscribers to handle the timing and event and exception notification of data handling between the ESBs and personnel. MIAC gives the ability to define a set a further of rules of engagement where personnel become an integral and necessary part of a given workflow. Often the systems connected with an ESB use a plugin and external notification system that does not handle workflow process. MIAC has the ability to use API calls to instigate the creation of new tasks that translate and direct data from one system to another on the same platform where personnel are notified. This means that the MIAC system sends data and notifications from a single platform reducing the chance of failure of notification. The task can also be set to escalate notifications increasing the productivity rates of personnel.

System and Method for Integrating Workflow Processes with a Project Management System
US 20060241997 A1

This invention relies on the project management system to generate and define both projects and tasks. This invention creates a workflow process that integrates with a single project management system. The workflow invention executes and tracks the workflow and integrates the information back into the project management system. Where this invention creates a workflow process MIAC uses existing operational processes to create a workflow. It does not require a project management system to generate projects and tasks. This is handled by the administrator via the user interface and where a project is a descriptive term used to identify certain parts, locations, areas within, processes or other descriptive terms of a business and where tasks are created via the UI to be carried out. A task may be of a standard communicative level or may be set to integrate one software, application or data output with another system to create an action. Actions within a task can be set to escalate when not actioned or where notifications have been missed at a pre-determined time scale. Tasks can be reassigned to other personnel where action due dates/times can be placed within the task. Each task, if more than a one step process includes a bread crumb trail so all involved in the workflow within the task can view the history of the work flow, its current position and communicate within the task body. Each entry and action is recorded with time, date and personnel stamp along with a description of an action if it has taken place. This system can integrate into a project management system along with other software including accounting, payroll, machinery and other types of software using a generic API library as well as receiving sensor alarm raw data and translate the data to create a subsequent action or notifications. The generic API library is made available to a system administrator to make test and deploy the integrations, connections, alerts, information and escalation within any of the task workflow automated and required manual actions to complete the task workflow within the prescribed timeframe.

Project Management Method and Information Integration System
US 20050010463 A1

Although some of the items addressed by this invention are similar in description as the MIAC invention, they are reduced to a single task with one person with read write abilities and one read only ability to each task. The task can gather information from a plurality of sources and make them available to the person assigned to the task with notifications, due date and completion alert capabilities.

MIAC allows a task to house multiple steps, multiple personnel and multiple integration possibilities within a single task creating a workflow within a task. This vastly reduces the instance of task creation requirements within a system and less work for an administrator or project manager to monitor. As the processes progress within a task notifications are sent to the required personnel to carry out their process within a task. Management or system administrators are only notified when a task fails and is escalated, triggers an escalation from exceeding a due date or time frame or is invited into the task by a personnel who is in need of advice. When an admin or manager enters the task the history of the workflow within the task including all communications is present for them to review making managerial decisions quicker and more precise as the complete set of raw data is saved within the task body.

Work Management Using Integrated Project and Workflow Methodology
US 20090048896 A1

In this invention management is orchestrated using a set of tasks under a project to manage a work flow of processes under or within a project. Operational activities are set as unique tasks under the project and are managed with scheduling and cost managed in micro views. Even operational activities are broken down to tasks and where the operational activity becomes a project.

In the MIAC invention, operational activities can be set to become a scheduled workflow within a task where the completion of a process within a task notifies the next link in the process chain to begin work on or direct data to the next process within the task or where a completion of a process triggers a set of data from one IT or operational system to be integrated with another subsequent system or a physical task for a human to perform. Alerts from one internal process can also trigger the beginning or creation of a new task in another area of a business and simultaneously carry on with the process workflow that exists in the original task. Notifications can be sent to any personnel associated to a task or process within a task limiting the need for micro management. Management becomes responsive to problems faced within a task at any point via due date or time lapses where escalation alerts are created and notify management or where they are invited to have input into the task body. By reducing the amount of separate tasks, even if they are linked via a project, the system allows for a more realistic and precise workflow. Communication between personnel that exist within a task but on separate processes are able to communicate within the task along with having access to all previous communications. This allows personnel to become more involved and proactive within any given task and workflow raising productivity of operational staff and reducing the management requirements of an operation significantly. By reducing management requirements in these areas the system allows the management personnel to concentrate on more productive and lucrative activities.

Many disparate systems, including information technology (IT), operational technology (OT) sensors, personnel or human communications (HR) systems and mobile devices (MD) are used to perform business processes (the systems). They are often run in a "chain of events" of individual processes to perform a start to finish or end-to-end work flow. Some of the systems are connected to each other via API to generate a logical or known next-step action, but where connectivity is not available, cost effective or difficult for the business to do independently, manual data transfer is necessary. This increases the frequency of human intervention and error into the process. These manual transfers account for a large proportion of process failures and interruptions resulting in lost productivity and profit. Systems which have the inability to connect in a reliable and stable manner may be viewed by their clients as unusable and or render the product unsaleable.

Organisations implement many different systems across a variety of platforms to manage a range of businesses processes to control and improve productivity, cost, savings and profit. The current high cost of system integration is a key reason for organisations not integrating systems when it is more cost-effective to maintain manual data transfer in spite of increased risk of human error and productivity foregone.

As 'the systems' are written in different computer languages, it is a significant challenge to integrate IT, OT, MD (mobile device) and HR systems to act and perform in vastly different ways. Some integration systems on the market such as ESB (Enterprise Service Bus) technology have the ability to connect a variety of IT and sensor solutions via an online or virtual vehicle, the bus. This allows some connections between the available systems on any given 'bus'. The main focus of ESB solutions is to provide connectivity and integration between the ESB vendor applications along with the ESB service itself. Connection is possible with external IT products. These are approved to access the ESB on a case by case basis with access provided, of a bespoke nature by the ESB provider at their discretion.

The volume and complexity of code writing work involved in connecting systems within a Bus is extensive and usually requires a 3rd party provider to the ESB provider to complete the service. Associated system maintenance includes not only system support from the ESB provider but the 3rd party connection provider as well.

Some open source (OS) ESB providers provide a cheaper entry point and more functional user interface (UI) that allows clients to build their own ESB, but the drawback is a more limited functionality and choice. Many of the connections are simple or surface interfaces that suit smaller sales operations connecting public and free applications to software for sales monitoring etc. These ESB's do not fit the requirements of larger organisations with complex processes and systems.

ESB's are a software defined network (SDN). They rely on the connection between one application or software system and another. Systems use the 'BUS' to direct data between each other via an API to API and north and south bound data transaction directly into and out of each system. External notification to personnel requires an external and separate system to be introduced to the bus. For example; Microsoft's ESB model offers BING, a social network, to communicate alerts from the BUS to allow collaboration in the workforce. Personnel notifications and communications is a plug-in application approach to the involvement of personnel in a business process and does not integrate a defined workflow into a process that is easily accessible. Stated another way:

Application program interfaces are well known in the art.

They enable third parties to communicate and interact with application software in order to integrate the data and capabilities of that application with other services and applications.

A common problem with a standard API system is that a person wishing to integrate that application with other applications or services must first learn the API structure including calls and functions of all the systems to be integrated before building the integrated system.

This problem is complicated further by the fact that, often, integration is being done across multiple applications and services from different vendors, where each individual API may have its own unique call and function description and operation set.

To date there has been no standardized API interpretation service to normalize the language functionality and naming of calls and functions across any combination of applications and or services, across any and all vendors.

One attempt to do something similar to this is a service called "If This Then That" (IFTTT). This service converts the API's of some popular services such as Google Mail and Twitter, amongst others, and allows end users to build integrated procedures. For example, an email sent to a specific address could be converted to a Twitter message. This service, while popular, does not fulfil the needs of a typical professional system integrator.

In the case of IFITT, the API's of a connected application are combined, extended and simplified into modules that allow fairly mundane and simple interactions to be accomplished.

This architecture does not solve the problem previously outlined, in that to achieve a truly powerful and flexible system integration, the most complex and specific API calls and functions available from an application must be available to the integrated system in order to achieve the maximum benefit from the integration with other applications or services.

The IFTTT modular approach simplifies, automates and in many ways dumbs down API calls and functions of an application in order to make them more accessible to an everyday user.

This approach severely limits the power and functionality of a professional, integrated, multi-application and service system.

The disclosed invention is designed to address these issues.

SUMMARY OF THE INVENTION

Accordingly, in one broad form of the invention there is provided a business process integration computer software system incorporating at least a first and second and preferably three data platforms to create a single, comprehensive communications and integration network to facilitate the integration of and communication between software, computer programs, machinery, sensors and any digital data producing system or platform that can be connected to with a project and task governed network in a hierarchical task and project interface.

Preferably there is disclosed a standalone project and task based communications network where people are assigned to projects and tasks incorporating the assigned personnel into a task workflow of related processes combining information technology systems, operational technology systems, human processes and manual tasks within a workflow in a project and task framework.

Preferably there is disclosed a project and task based platform combined with a personnel register to authorise and assign people to projects and tasks or with a process or workflow within a task for communication transactions in a secure and hierarchical manner.

Preferably there is disclosed a project and task based platform combining a personnel register to authorise and assign people to projects and tasks or with a process or workflow within a task with an integration module where information technology systems, operational technology systems, human processes and manual tasks can be combined to create an end-to-end workflow within a task.

Preferably there is disclosed a system of security where only people allocated or associated with a task or project are assigned to access or interact at various security levels with the task and where notifications are directed to appropriate personnel to preserve the continuity of a workflow.

Preferably there is disclosed a system of escalation of tasks for failures of data transactions, failure of completion before a due date or time for an action or where a senior personnel is invited to a communication within a task.

Preferably there is disclosed a user interface (UI) to create and control the system in both project and task set up, personnel additions, security and process creation within a task.

Preferably there is disclosed a system to store and access API data for known systems for the purpose of integrating one system with another or in plurality across the task elements of the system architecture.

Preferably there is disclosed a translation system supporting the ability to integrate and automate between systems from different platforms and origins using the same personnel communications network architecture to allow all communications between all systems and people to be facilitated on a single, central matrix software platform.

Preferably there is disclosed a communications platform where transactions within a task are communicated in various ways and recorded in a digital repository for immediate notification or later use.

Preferably tasks are located under projects and are assigned people to communicate within from either web or mobile device and where all communications are recorded and digitally stamped with the time, date, location (from mobile device or IP address if CPU) and person who has made the entry.

Preferably a project is set by an authorised person, it houses child projects and tasks in a logical business manner as desired by the user. A project may house both child projects in the same place where high level tasks can be separated from lower level personnel and where these high level projects and tasks are not visible to the lower level personnel. Personnel only see the projects and tasks they are associated with in a need to know basis. The higher up the hierarchical chain the more they have access to.

Preferably the task is a repository of all communications of a task which can be accessed by people assigned to the task and all personnel above them in a hierarchical chain. Having access does not necessarily mean the see every communication, only those they wish to see of have been 'tagged' or invited to view and or participate in or where the task has escalated either automatically by the system or manually from a lower level personnel.

Preferably the task is where the 'API data transaction rule/s' is stored, translated and has next actions assigned to it along with assignment to personnel, escalation properties attributed and is a repository recording all transactional and communications data.

Preferably the task may be a single automated action where a data transaction between two systems is recorded and where the task is automatically closed without notification or the task may be set to alert a person who manually closes the task or a plurality of actions where data is sent to other systems for further actionable tasks with subsequent alerts.

Preferably the task can retain a set of processes in a breadcrumb style view where all process present in the task can be viewed by clicking the corresponding 'breadcrumb' title.

Preferably a system of security determines the access for each person on the system with privileges determined by the hierarchical chain above them.

Preferably administration accounts have all privileges to all projects, tasks and people. They can create and disable projects, tasks and accounts at their discretion. Accounts disabled are not deleted, they are recorded and kept for audit purposes.

Preferably administration grants security access to lower level personnel. They determine who is able to; create projects and/or tasks, invite a user, make any changes to a process, read/write privileges, read only, what the account user can see and do within the system. Often a user will be granted different rights and accesses with different projects and tasks within a system depending on their role within the company structure.

Preferably the hierarchical chain, depending on granted security clearances, can disable a lower account or where they do not have this clearance can alert an administrator to disable an account.

Preferably any change to a process within a task is recorded with time, date, what the change was and personnel who made the change.

Preferably a user interface is provided to generate both the project and tasks format and personnel list, grant access and privilege rights for people and assign them to the created projects and tasks.

Preferably security is granted for each user via organisation, project and task. As the system has the ability to introduce third or external parties into a project, task or workflow within a task a user is allocated an organisation ID where security options are granted by the user with access rights to that project and associated tasks. There may be circumstances where a user may have full security clearance capabilities in one area of the system but only read access to others and no access to unrelated projects. By assigning an organisation ID to all users security may be controlled by the relevant personnel associated to a project and grant security levels to all personnel within their 'domain'.

Preferably parent and child projects are also set by a relevant and cleared account holder who can also, depending on higher level security clearance, assign this privilege to other users within their 'domain'. They may assign the right to create a new child project under a parent project and all right under that child project. Other users may only be able to create new tasks under a child project and cannot see the parent project. Essentially each user is given access to only the tasks and projects that they are associated with in on 'need to know' basis.

Preferably users cannot see and do not receive messages, notifications or alerts for any project or task they are not associated with or invited to. They may contribute to a task communication via mobile device or web based CPU where all communications are recorded with date, time and personnel stamp including the data they have contributed or where any update or change to a task or project has been made. The update or change is recorded with an identifying action taken, personnel, date and time stamp.

Preferably an administrative account allows an administrator to activate new accounts, create projects, tasks and workflows and direct the correct personnel to activate security to new account holders. An admin has no access to information through their admin account but may have a secondary 'worker' account to access information on the system relevant to them. This allows IT personnel to grant access and apply rules without having full system access view to sensitive documentation etc. Example: an IT worker with admin rights would not have the rights granted to view tasks associated with accounts and CEO information.

In a further broad form, there is disclosed a system of escalation for communication of task failures or desired action is set under a task or process within a task.

Preferably there is disclosed within the user interface the administrator or security cleared personnel assigned to the task has the option to set a predetermined or allocated time frame for the task to be completed and similarly for a process within a task. The system has the ability to create an overall or clear deadline for a task to be completed and closed as well as the ability to create intermediate due date or milestone targets for processes within a task.

Preferably there is disclosed where a due date is set an escalation rule may be applied with who the escalation notification is sent to and given a priority from low to critical. Escalations may be built upon where a first escalation may be of low level and sent to a worker as a reminder to complete a process or task. If the task is not actioned by the required time a new escalation is triggered and sent to the worker and manager at normal levels and if the task does not get completed by the next revised time the escalation may be set to notify a general manager as high etc.

Preferably there is disclosed escalations are recorded and notifications link to the task or process within. The new or invited party to the task via escalation alert instantly has all raw data communications relating to the task and can make fast and accurate decisions based on this raw data.

In yet a further broad form of the invention, there is disclosed a user interface (UI) to create projects and tasks, set up processes within a task, invite and disable personnel accounts, set security for personnel, give access rights a privileges to individual accounts and access a generic API library for integrating software.

Preferably projects, child projects and tasks are set as a standard and understood tree structure for intuitive system building.

Preferably processes within tasks are also simplified by giving the administrator or approved personnel the ability to create a single or set of forms to deploy through a task to personnel to facilitate individualised procedures and processes. This allows a standard to be created for a physical task and alerts personnel assigned to the task with job requirements, expected completion time. Escalation and notification rules are attached to either a task or process within the task.

Preferably security may be set individually or by role. By setting a role based security the system applies a global set of rules over the roles where read/write, edit and viewing capabilities are set.

Preferably administrators may also access the generic API library (GAL) and download a known API to use for integration with another known product. The UI also allows the user to set up escalation on failure or success. Notifications are also available to be set under the task or process within the task within the UI.

In yet a further broad form, there is disclosed a generic API library (GAL) where all API structures and known integrations are stored and where these structures integrations can be accessed and used for subsequent integrations via user interface (UI).

Preferably the user interface allows a person with the necessary security clearances to access the GAL and choose an API, Raw data sensor actions, mapped database schema etc. from a list of available products and places the available data fields into a column designated as an origin system. The API data fields are listed and placed in separate text fields. The API chosen must be a system that has been already been purchased or signed up for by the client.

Preferably an API is then chosen from the list and placed into a second column of destination the same way as in the origin. The API data fields are then matched with a drag and drop facility to match the data fields from one system to the other and give them the ability to be integrated. Some fields will be necessary and others will be optional depending on the origin and destination requirements of the data and the intent of the transaction. This step can be replicated to create a plurality of data transactions from one data source occurring at the same time.

Preferably the GAL is to define a standard set of processes that can be used to create or replicate a known process for different clients. The access commands will change but the known process or set of processes can be replicated in different accounts making it cheaper and easier to implement the process or set of processes.

In yet a further broad form of the invention, there is disclosed a method of creating an integrated, process based workflow of data exchange and communication between different systems, services and people.

Preferably all data exchange is retained within tasks. One action may trigger another within the task and where the actions are listed in sequence as a breadcrumb view to show a user where the process is up to. This allows time limits to be set for each action and allows both automated data exchanges and manual human actions to be a part of a single workflow within one task.

Preferably communication between (for example) a sensor to a computer system may be interjected by a person. Where a person is allocated to a task and the task, while successful, is found by the operational personnel to need some refinement, they may comment within the task with their findings, add photographs etc. and escalate the task to a more senior personnel with a request for refinement/change to the process. They can do this by inviting the senior user to the task comment repository. Even if the senior user is not directly associated to the task they will have the ability to manage the request or escalate to the correct personnel to make the necessary changes.

In yet a further broad form of the invention, there is disclosed a method of collecting, recording and accessing 'BIG DATA segments' which are a part of a workflow.

Preferably the system records critical data where an exchange has taken place and logs it within the task to which it is associated with. This allows data to be collected in a logical and sequential way where process refinement, component performance and personnel performance can be monitored easily and quickly.

Preferably where a process fails the data is used to trigger alerts to people and where an action does not take place the alert can be set to escalate up the hierarchical chain of command automatically or manually. The response times for critical tasks is vastly reduced by allowing the assigned personnel of a task to have an instant and accurate view of all of the actions and events leading up to a failure allowing them to assess a critical problem, make informed mitigation actions and communicate their actions with a task response and or mitigative process directly to all involved in the task. The task allows the personnel on the scene of the 'hot spot' to communicate directly with higher level management to approve actions or direct actions from a control or management to the coalface of the issue.

Preferably the MIAC system is not concerned with all data or BIG DATA. It is only concerned with data that is relevant to an operation. It does not monitor all data produced rather it acts upon known data. The system however may integrate into a big data monitor and react upon threshold limits set within the data monitor system as desired by MIAC clients. Example: a monitor system may be set to recognise a commodity price when it reaches a particular price. On reaching the price limit whether it is high or low the system can alert MIAC which may be set up to hold a purchase or alert a salesperson to buy.

In at least a first embodiment the present invention incorporates an integrated hierarchical personnel architecture within a project and task-based platform where connections between IT, OT, sensors MD and HR are deployed or facilitated from a central project and task based hierarchical platform. The system creates transactional data exchange capability without limiting the choice of product used and creates barriers or 'firewalls' between data exchanges allowing external supplier systems to be incorporated within internal processes. It allows for the introduction of human manual processes to take place within an automated data exchange workflow. The system allows MIAC clients to choose and integrate products over a vast variety of platforms, increasing productivity both in production and personnel terms, reducing risk, and involving both internal and external personnel in end-to-end work flows, increasing the capability to substantially increase profit. People added to the system must be invited by an administration account holder or where a person within the system has been allocated the security clearance to add a new account/user. The system sends an email invitation with the necessary details for application download and password/username requirements along with system use instructions.

The underpinning architecture is a hierarchical project and task system where personnel are assigned to a task by either a role-based or individual manner. The platform allows for project and task creation to mirror hierarchy or other corporate structure, to ensure secure and accurate delivery of information and communications. The task is the host, or silo, of pre-defined rules, actions, transfers and communications between connected 'systems' and/or personnel. The user interface (UI) displays information, workflow, actions, time bars, communications, notifications and current tasks for each user. A data base repository stores all projects, tasks, actions and communications within the task. Information and alerts are generated and delivered to the personnel assigned to the task upon unique ID #login from either personal computer, laptop, or mobile device. Tasks can be set to function in a number of ways to facilitate the desired outcomes (see claims). Incorporating connected 'systems' and personnel within a single architecture, allows the interpretation, use, delivery and storage of small relevant portions of 'BIG DATA' to be accurate, intelligent and narrowly targeted. Whilst all data transactions and communications are recorded, each task maintains only the data that has been used to trigger actions relating to that task along with the associated personnel communications. Alerts generated from connected 'systems' may trigger the creation of subsequent tasks within the architecture that may or may not have subsequent actions and/or alerts. This allows for "Big Data" to be effectively interrogated and interpreted, with only events that require action being communicated to appropriate personnel and/or connected systems, thereby substantially reducing the need for data analysis.

The system uses both current and new technology to advance the capabilities of business and process automation. It allows business systems across multi and diverse platforms to become interlinked and automated within a workflow. It allows the use of proprietary software and applications, 3rd party software and applications, public resources, sensors and niche or client owned software and applications to reside, as equivalents, on an underlying business project and task personnel network, available for connection to and interlinking within any given process.

The architecture allows a MIAC user to introduce 3rd party supplier software and personnel to connect within allocated portions of the network's architecture via tasks, without granting access to other business information, processes or software. By obtaining the 3rd party API from the GAL (Generic API Library), a MIAC client can incorporate communications and data directly from a third party system from outside the organisation directly into an internal work flow. Additionally, a 3rd party supplier may want to populate a MIAC client system. A task is created for the client together with a form, or set of forms, that are accessible via web or mobile device. The form replicates the data entry requirements of the system the external party wishes to populate. On saving the form the task transmits the data through an API into the required system. When new data is recognised by MIAC in the client system, MIAC generates a new task in a different project for subsequent actions, data transactions and/or notifications to relevant personnel.

The MIAC system conducts all of its transactional integrations and communications between connected systems from a central portal. It does not require software or data connections to be present to operate as a purely personnel or human to human communications device but offers the client the ability to integrate between IT, OT, MD and personnel systems thereby introducing the ability to implement decision making and human tasks into an automated workflow.

"Black boxes" or translator boxes (software translation of code) are produced to convert data from one language to a target language. The data is mapped from the origin or source of the data and sent via the 'black box' which rearranges the data into the required format for the destination software or be converted into a standard message to be delivered to personnel. To connect via the cloud a 'black box' is created and placed in the cloud on the path between the MIAC system and the destination system. An onsite server-based software is communicated to via loading a black box on the on site server to perform the translation and transactional duties. Sensors deliver a different data style from software and application programs. They deliver 'raw data', a string of code which refers to an event. The MIAC system detects and cross-references the event raw-data in the GAL, and generates a new task in a project. A form is populated with the translated data which notifies defined personnel with a pre-defined notification (task) that allows subsequent actions and alerts to be performed and recorded.

A Generic API Library (GAL) is a warehouse of known API structures, schema mappings and sub-processes that are made available to be applied and Implemented into a process and/or workflow via the MIAC user interface (U1). The UI allows the client to search and choose a product API from the GAL and upload it to their MIAC UI as an origin system. The client may then choose a destination product from the GAL and upload it to the destination API column. The API structures are shown as a form. With simple drag and drop from origin to destination the client can build a rule for a transaction based on their needs. This transactional rule can then be applied to a task and tested. Once the test has been successful the task can be implemented into a live workflow. The client may also request MIAC staff to obtain an API for a desired product or provide access to their own proprietary product for inclusion.

The GAL also acts a warehouse for purpose-built system applications that includes standardised tasks and workflows for clients to implement into their core system accounts. These items are made available to a client in the form of pre-built system specific applications that may include any configuration of the core systems functionalities to be imported and deployed to fill a desired process requirement or outcome. This allows clients to browse sets of pre-built applications and implement them into live systems without having to re-invent desired standard process. The system also allows clients to make changes or tweak and mould an imported task or workflow application to suit niche business process, reducing time spent on development.

The GAL acts as a marketplace where any element of a task or workflow including but not limited to API structures, raw data, tasks and workflows may be provided by independent developers for purchase by clients. This will allow developers to design and sell applications from within the GAL creating an external income stream for developers and grow the client base and penetration of the MIAC product without impacting on the core system functionality.

In addition to developer offerings, clients may also request items not yet available to be developed for them on a bid or direct request basis via the marketplace. This allows the core system to be supplied and maintained without the requirement to support multiple external applications. Support will be offered by the developers or licensed agents to assist clients, allowing the core platform and licensee support to remain the sole focus and requirement for the platform supplier in accordance with one embodiment of the GAL, the present invention provides an architecture for communication between clients and independent developers to produce both standard and bespoke applications purpose built for the core system while remaining independent of the core system;

A client may place a request for a standard process to be developed for them and put the request to tender via the GAL. Developers will bid for the job on the basis of supplying the new application to the GAL for sale to both the client and any other subsequent sales to other system clients. A client may request a bespoke workflow to be produced and not included on the GAL for subsequent sales, where developers will bid for the job and supply the workflow without the new product being added to the public marketplace. A client may directly invite a developer to produce an item for them without going through the bidding system. The new product may or may not be included in the marketplace on advice from the client.

In accordance with one embodiment of the invention, the present invention provides an architecture of communication and/or integration between systems on different platforms;

software event; A software event may trigger and deploy information into a task signaling the start of a new workflow. Multiple actions including all or any of the connection possibilities where data is deployed to create an action or series of actions can be created. A software event may open a task and on success, record the detail of the transaction and close the task with or without notification to assigned personnel. A software event may open a task and, on failure, alert personnel assigned to the task at either the data origin, destination or both. A software event may open single or multiple tasks across a number of pre-defined destinations to perform subsequent tasks simultaneously.

sensor event; A sensor may trigger an event and deploy information into a task signaling the start of a new workflow. The sensor event triggers a new task, detects incoming data, cross references and attributes actionable data, fills a form or forms relating the data to a destination system or systems in understandable formats and API's the data to the destination/s. The sensor event may open a task and on success, record the detail of the transaction and close the task with or without notification to assigned personnel. The sensor event may open a task and, on failure, alert personnel assigned to the task at either the data origin, destination or both. A sensor event may open single or multiple tasks across a number of pre-defined destinations to perform subsequent tasks simultaneously.

operational system event; An operational event may trigger and deploy information into a task signaling the start of a new workflow. An OT event may open a task, data is detected, translated and deployed to an IT, other OT, sensor or personnel system as an alert or an instruction. The operational system event may open a task and on success, record the detail of the transaction and close the task with or without notification to assigned personnel. The operational system event may open a task and, on failure, alert personnel assigned to the task at either the data origin, destination or both. An operational system event may open single or multiple tasks across a number of pre-defined destinations to perform subsequent tasks simultaneously.

personnel event; Where a person creates a task and completes a pre-defined form that creates a data entry into another system; (example; IT or OT) for a task that needs to take place. The data entry event may open a task and on success, record the detail of the transaction and close the task with or without notification to assigned personnel. The data entry event may open a task and, on failure, alert personnel assigned to the task at either the data origin, destination or both. A data entry event may open single or multiple tasks across a number of pre-defined destinations to perform subsequent tasks simultaneously.

system (IT, OT, sensor) to personnel to software where a system even event opens a task alerting a personnel.

The personnel then chooses a pre-determined form and fills the form from a mobile device or web portal, the form, on save, sends the data via API to the destination software as a direction, order etc. The data entry event may open a task and, on failure, alert personnel assigned to the task at either the data origin, destination or both. A data entry event may open single or multiple tasks across a number of pre-defined destinations to perform subsequent tasks simultaneously.

human to human communications where a task is opened for free form communication between two or more personnel under a project.

In another embodiment of the invention relating to projects and tasks and the hierarchical personnel connections the system is set up via the UI where;

Parent or Head Projects are created as governing locators of projects example; locations, departments, addresses etc.

Child or Sub-Head projects are created under the Parent Project for various projects within a parent project for example; accounts, sales, OH&S etc. Further smaller or more refined projects can be set up under child projects.

Tasks are created under Parent Projects, Child Projects, Subsequent Child projects etc.

A task has the ability to trigger the creation and start of another task. A process within a task on completion may trigger the start of another or multiple tasks within other projects.

A task acts as a firewall between systems where corrupted, unknown or incorrect data that is supplied will result in a transfer failure and subsequent failure alert to task assigned personnel at either end of the transaction or both.

A task may host a third party system integration into an internal process and firewall the external system from the internal operation, allowing operational specific and controlled integration with the external system into the internal workflow or process.

A task may have an "escalation alert" component allocated on a time and or manual basis. If an alert is not opened and or actioned in the required time the task is escalated to the next level within a hierarchy and in the event of further inaction the task can be escalated in incremented times up the hierarchical chain of command to the top layer for assessment/action to be taken. If a person requires the task to be escalated they can do so via web service or device application.

Projects and tasks may include assignment of third party or external personnel and assign them to tasks that relating their IT or OT system. Alerts and communication with internal personnel can be carried out within an internal task without the external party being privy to internal information.

In another embodiment of the invention the system allows for the storage and use of a generic API library (GAL), user interface (UI) and transactional storage facility;

The audit vault is accessible with permissions, where all communications between all transactions and communications from connected systems, sensors and personnel are stored for refining process, component lifecycle performance and personnel performance reviews, substantially reducing the need for data mining/data analysis services.

A user interface (UI) allows the user to build the project, task and personnel hierarchies to create the necessary forms, integrations and process flows between connected services and personnel and to facilitate workflows mirroring current processes or to create new workflows.

A generic library where mapped API's, mapped schemas, mapped sensor code and known processes between each system or systems may be applied via the user interface to reduce cost and speed the connection time between desired connections and integrations between systems.

In another embodiment of the invention the system allows the introduction of third party communication incorporating their systems and personnel.

A third party system may be connected as a process within a workflow via API or mapped data schema and introduced as an incoming or outgoing process within a work flow.

Any publicly available API may be included and accessed via the GAL to be used/utilised into a process including items such as weather, tide times etc.

In a further broad form of the invention there is provided a business process integration computer software system incorporating 3 data platforms to create a single, comprehensive communications and integration network to facilitate the integration of and communication between software, computer programs, machinery, sensors and any digital data producing system or platform that can be connected to with a project and task governed network in a hierarchical task and project interface, as follows:

A standalone project and task based communications network where people are assigned to projects and tasks incorporating the assigned personnel into a task workflow of related processes combining information technology systems, operational technology systems, human processes and manual tasks within a workflow in a project and task framework.

A project and task based platform combined with a personnel register to authorise and assign people to projects and tasks or with a process or workflow within a task for communication transactions in a secure and hierarchical manner.

A project and task based platform combining a personnel register to authorise and assign people to projects and tasks or with a process or workflow within a task with an integration module where information technology systems, operational technology systems, human processes and manual tasks can be combined to create an end-to-end workflow within a task.

A system of security where only people allocated or associated with a task or project are assigned to access or interact at various security levels with the task and where notifications are directed to appropriate personnel to preserve the continuity of a workflow.

A system of escalation of tasks for failures of data transactions, failure of completion before a due date or time for an action or where a senior personnel is invited to a communication within a task.

A user interface (UI) to create and control the system in both project and task set up, personnel additions, security and process creation within a task.

A system to store and access API data for known systems for the purpose of integrating one system with another or in plurality across the task elements of the system architecture.

A translation system supporting the ability to integrate and automate between systems from different platforms and origins using the same personnel communications network architecture to allow all communications between all systems and people to be facilitated on a single, central matrix software platform.

A communications platform where transactions within a task are communicated in various ways and recorded in a digital repository for immediate notification or later use.

In a preferred form tasks are located under projects and are assigned people to communicate within from either web or mobile device and where all communications are recorded and digitally stamped with the time, date, location (from mobile device or IP address if CPU) and person who has made the entry.

A project is set by an authorised person, it houses child projects and tasks in a logical business manner as desired by the user. A project may house both child projects in the same place where high level tasks can be separated from lower level personnel and where these high level projects and tasks are not visible to the lower level personnel. Personnel only see the projects and tasks they are associated with in a need to know basis. The higher up the hierarchical chain the more they have access to.

The task is a repository of all communications of a task which can be accessed by people assigned to the task and all personnel above them in a hierarchical chain. Having access does not necessarily mean the see every communication, only those they wish to see of have been 'tagged' or invited to view and or participate in or where the task has escalated either automatically by the system or manually from a lower level personnel.

The task is where the 'API data transaction rule/s' is stored, translated and has next actions assigned to it along with assignment to personnel, escalation properties attributed and is a repository recording all transactional and communications data.

A task may be a single automated action where a data transaction between two systems is recorded and where the task is automatically closed without notification or the task may be set to alert a person who manually closes the task or a plurality of actions where data is sent to other systems for further actionable tasks with subsequent alerts.

A task can retain a set of processes in a breadcrumb style view where all process present in the task can be viewed by clicking the corresponding title.

In a preferred form the system of security determines the access for each person on the system with privileges determined by the hierarchical chain above them.

Administration accounts have all privileges to all projects, tasks and people. They can create and disable projects, tasks and accounts at their discretion. Accounts disabled are not deleted, they are recorded and kept for audit purposes.

Administration grants security access to lower level personnel. They determine who is able to; create projects and/or tasks, invite a user, make any changes to a process, read/write privileges, read only, what the account user can see and do within the system. Often a user will be granted different rights and accesses with different projects and tasks within a system depending on their role within the company structure.

The hierarchical chain, depending on granted security clearances, can disable a lower account or where they do not have this clearance can alert an administrator to disable an account.

Any change to a process within a task is recorded with time, date, what the change was and personnel who made the change.

In a preferred form a user interface is provided to generate both the project and tasks format and personnel list, grant access and privilege rights for people and assign them to the created projects and tasks.

Security is granted for each user via organisation, project and task. As the system has the ability to introduce third or external parties into a project, task or workflow within a task a user is allocated an organisation ID where security options are granted by the user with access rights to that project and associated tasks. There may be circumstances where a user may have full security clearance capabilities in one area of the system but only read access to others and no access to unrelated projects. By assigning an organisation ID to all user's security may be controlled by the relevant personnel associated to a project and grant security levels to all personnel within their attributed 'security domain' access approvals.

Parent and child projects are also set by a relevant and cleared account holder who can also, depending on higher level security clearance, assign this privilege to other users within their 'domain'. They may assign the right to create a new child project under a parent project and all right under that child project. Other users may only be able to create new tasks under a child project and cannot see the parent project. Essentially each user is given access to only the tasks and projects that they are associated with in on 'need to know' basis. Users cannot see and do not receive messages, notifications or alerts for any project or task they are not associated with or invited to.

They may contribute to a task communication via mobile device or web based CPU where all communications are recorded with date, time and personnel stamp including the data they have contributed or where any update or change to a task or project has been made. The update or change is recorded with an identifying action taken, personnel, date and time stamp.

An administrative account allows an administrator to activate new accounts, create projects, tasks and workflows and direct the correct personnel to activate security to new account holders. An admin has no access to information through their admin account but may have a secondary 'worker' account to access information on the system relevant to them. This allows IT personnel to grant access and apply rules without having full system access view to sensitive documentation etc. Example: an IT worker with admin rights would not have the rights granted to view tasks associated with, for example; accounts or CEO level information.

In a further broad form of the invention there is provided a system of escalation for communication of task failures or desired action is set under a task or process within a task.

Within the user interface the administrator or security cleared personnel assigned to the task has the option to set a predetermined or allocated time frame for the task to be completed and similarly for a process within a task. The system has the ability to create an overall or clear deadline for a task to be completed and closed as well as the ability to create intermediate due date or milestone targets for processes within a task.

Where a due date is set an escalation rule may be applied with who the escalation notification is sent to and given a priority from low to critical. Escalations may be built upon where a first escalation may be of low level and sent to a worker as a reminder to complete a process or task. If the task is not actioned by the required time a new escalation is triggered and sent to the worker and manager at normal levels and if the task does not get completed by the next revised time the escalation may be set to notify a general manager as high etc.

Escalations are recorded and notifications link to the task or process within. The new or invited party to the task via escalation alert instantly has all raw data communications relating to the task and can make fast and accurate decisions based on this raw data.

In a further broad form a user interface (UI) is utilised to create projects and tasks, set up processes within a task, invite and disable personnel accounts, set security for personnel, give access rights a privileges to individual accounts and access a generic API library for integrating software.

Projects, child projects and tasks are set as a standard and understood tree structure for intuitive system building.

Processes within tasks are also simplified by giving the administrator or approved personnel the ability to create a single or set of forms to deploy through a task to personnel to facilitate individualised procedures and processes. This allows a standard to be created for a physical task and alerts personnel assigned to the task with job requirements, expected completion time. Escalation and notification rules are attached to either a task or process within the task.

Security may be set individually or by role. By setting a role based security the system applies a global set of rules over the roles where read/write, edit and viewing capabilities are set.

Administrators may also access the generic API library (GAL) and download a known API to use for integration with another known product. The UI also allows the user to set up escalation on failure or success. Notifications are also available to be set under the task or process within the task within the UI.

In yet a further broad form of the invention as provided a generic API library (GAL) where all API structures and known integrations are stored and where these structures integrations can be accessed and used for subsequent integrations via user interface (UI).

The user interface allows a person with the necessary security clearances to access the GAL and choose an API, Raw data sensor actions, mapped database schema etc. from a list of available products and places the available data fields into a column designated as an origin system. The API data fields are listed and placed in separate text fields. The API chosen must be a system that has been already been purchased or signed up for by the client.

An API is then chosen from the list and placed into a second column of destination the same way as in the origin. The API data fields are then matched with a drag and drop facility to match the data fields from one system to the other and give them the ability to be integrated. Some fields will be necessary and others will be optional depending on the origin and destination requirements of the data and the intent of the transaction. This step can be replicated to create a plurality of data transactions from one data source occurring at the same time.

Another embodiment of the GAL is to define a standard set of processes that can be used to create or replicate a known process for different clients. The access commands will change but the known process or set of processes can be replicated in different accounts making it cheaper and easier to implement the process or set of processes.

In yet a further broad form of the invention there is provided a method of creating an integrated, process based workflow of data exchange and communication between different systems, services and people.

All data exchange is retained within tasks. One action may trigger another within the task and where the actions are listed in sequence as a breadcrumb view to show a user where the process is up to. This allows time limits to be set for each action and allows both automated data exchanges and manual human actions to be a part of a single workflow within one task.

Communication between (for example) a sensor to a computer system may be interjected by a person. Where a person is allocated to a task and the task, while successful, is found by the operational personnel to need some refinement, they may comment within the task with their findings, add photographs etc. and escalate the task to a more senior personnel with a request for refinement/change to the process. They can do this by inviting the senior user to the task comment repository. Even if the senior user is not directly associated to the task they will have the ability to manage the request or escalate to the correct personnel to make the necessary changes.

In yet a further broad form of the invention there is provided a method of collecting, recording and accessing 'BIG DATA segments' which are a part of a workflow.

Big Data streams are growing at astounding rates and as new technology is created every day the increase is exponential. The system records critical data where an exchange has taken place and logs it within the task to which it is associated with. This allows data to be collected in a logical and sequential way where process refinement, component performance and personnel performance can be monitored easily and quickly.

Where a process fails the data is used to trigger alerts to people and where an action does not take place the alert can be set to escalate up the hierarchical chain of command automatically or manually. The response times for critical tasks is vastly reduced by allowing the assigned personnel of a task to have an instant and accurate view of all of the actions and events leading up to a failure allowing them to assess a critical problem, make informed mitigation actions and communicate their actions with a task response and or mitigative process directly to all involved in the task. The task allows the personnel on the scene of the 'hot spot' to communicate directly with higher level management to approve actions or direct actions from a control or management to the cold face of the problem.

The MIAC system is not concerned with all data or BIG DATA. It is only concerned with data that is relevant to an operation. It does not monitor all data produced rather it acts upon known data. The system however may integrate into a big data monitor and react upon threshold limits set within the data monitor system as desired by MIAC clients. Example: a monitor system may be set to recognise a commodity price when it reaches a particular price. On reaching the price limit whether it is high or low the system can alert MIAC which may be set up to hold a purchase or alert a salesperson to buy.

DETAILED DESCRIPTION OF PREFERRED EMBODIMENTS

Figure 1:
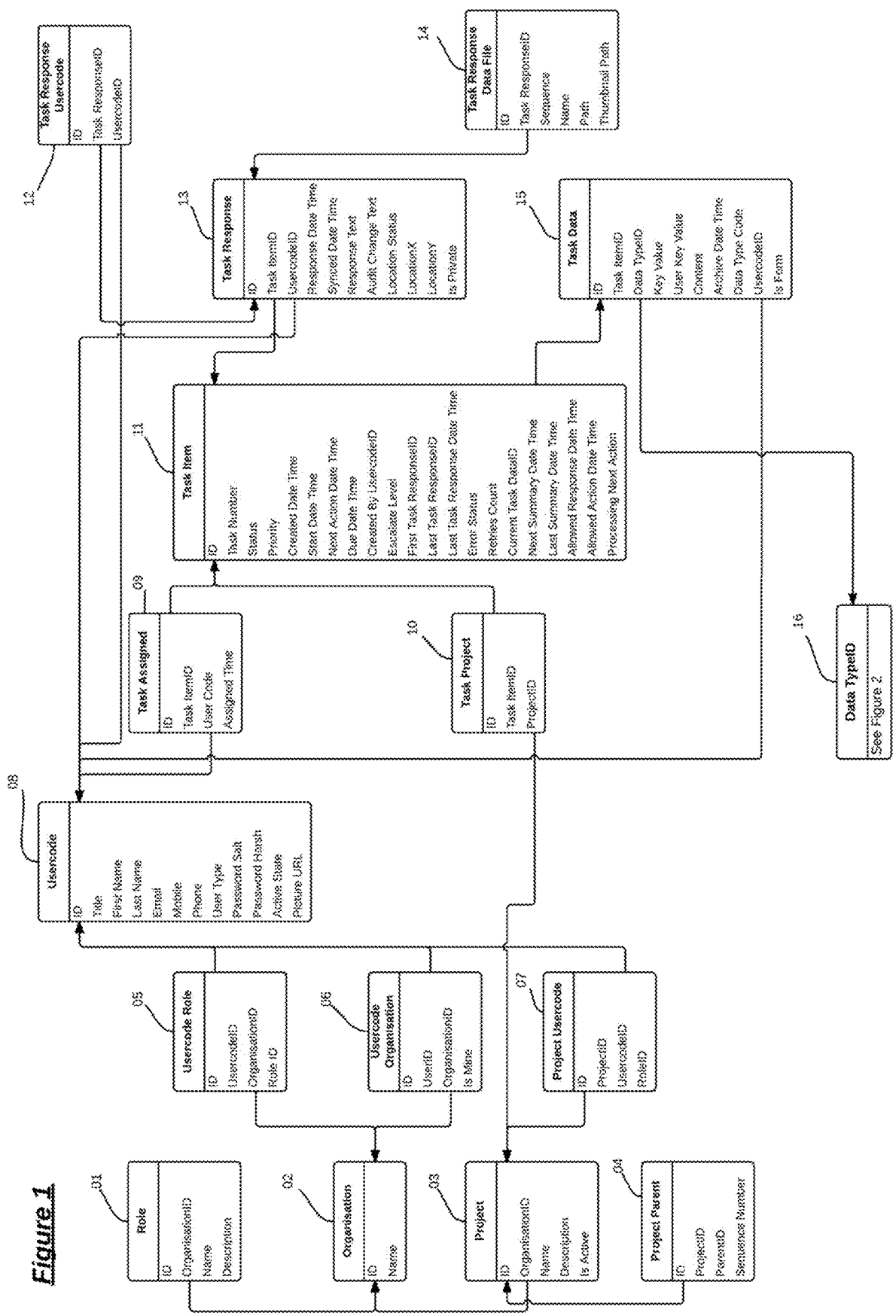
FIG. 1 is a code block diagram according to an embodiment of the invention.

With Reference to FIG. 1:

Each user that registers has a unique Usercode generated 08 and has an organisation 06 created for them. A user could belong to more than one Organisation. An 'IsMine flag' is used to indicate that this specific organisation belongs to that user.

The Usercode 08 determines the established role 01 within the business, example Supervisor, Nurse, Admin Assistant, etc. or other company structure. The user may hold different roles across different projects 07.

Project table 03 determines projects to be performed by the user. A project belongs to an organisation 02. The Project Parent 04 links projects together to provide a hierarchical structure.

The Project Usercode 08 links users to a project via 05, 06 and 07. It also includes the role 05 the user performs on the location located in Organisation 02. Example; A user may be a supervisor on one project but a worker on another.

Task Item 11 records each task assigned to a project. The Escalate Level found in table 11 is the current level of the task. If the task requires escalation, using established escalation rules as set by the person who created the task, the system changes this number, increment it by one, then use DataTypeNotify (see FIG. 2, 16) to determine who to escalate the task to via Usercode 08.

If a task is raised with a specific datatype (see FIG. 2, 16), example; INVOICE, the specific data for INVOICE will be stored in TaskData 15. As the task is actioned, the data may change and we will therefore have multiple TaskData 15 records per TaskItem 11. For example, a system generating TaskItem 11: INVOICE will send a certain set of data. MIAC will convert that data and raise a request for TaskItem 11 ACCOUNTUPDATE to be performed. This will contain differently formatted data. Each piece of data will have its own TaskData 15 record.

Task Response 13 is a specific response to a task. A response is usually made by a user and will contain a description of what action they have performed or what they have done. A TaskResponse 13 may also have a set of attached files and the system may send the response to multiple people.

Task Response Usercode 12 Links a response to one or more users via Usercode 08 and records and shows which users were sent the task response.

Task Response Data File 14 is a specific data file that was loaded on a task 11 or response 13. This may be an image, a PDF, document etc. It is different to the TaskData 15, which is specific for the type of data being processed, e.g. INVOICE. Task Response Data File 14 links data files to a specific response in 13. If a user uploads three photos and a PDF, there will be four Task Response Data File Link records associated with the response.

Figure 2:
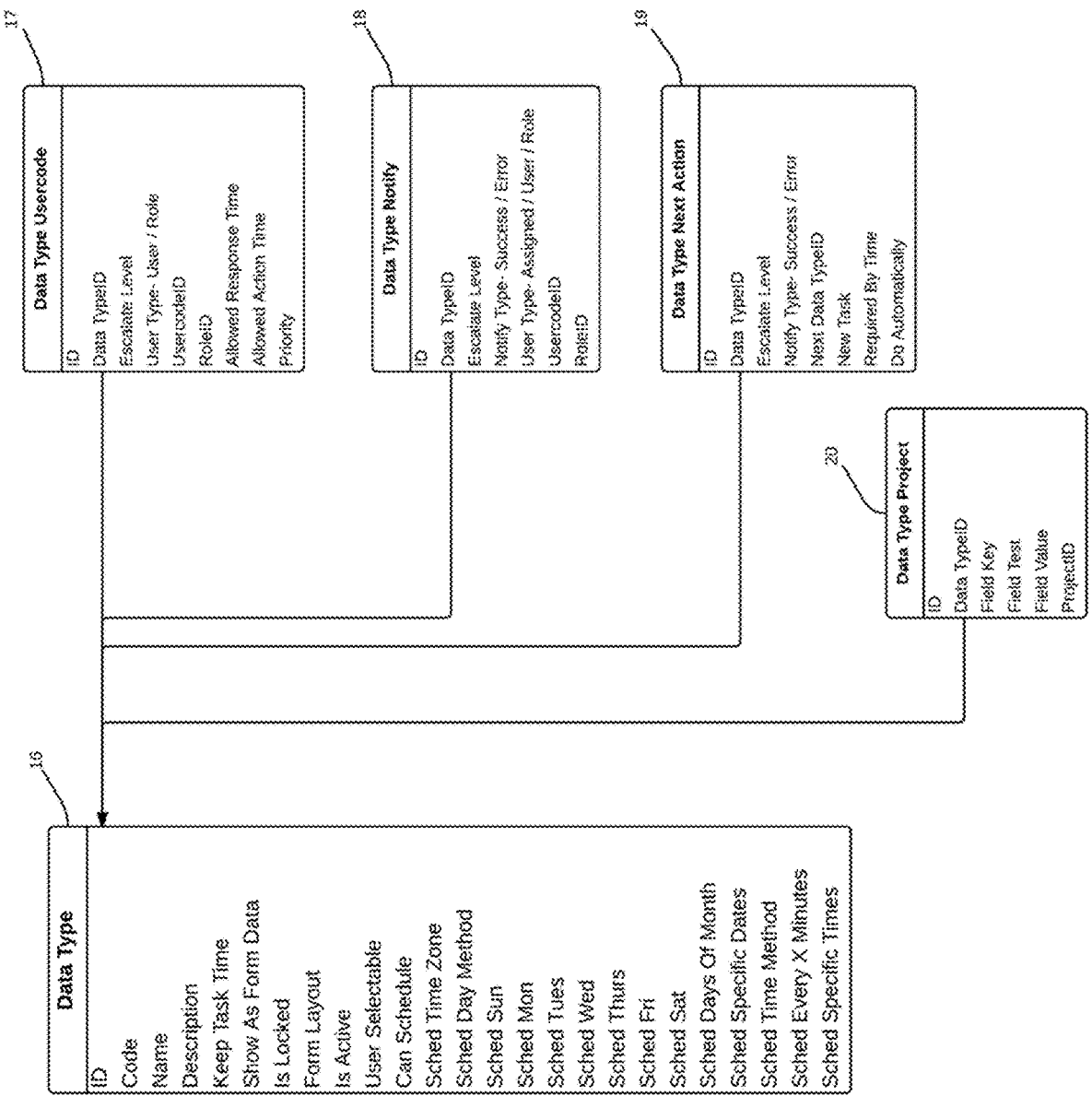
FIG. 2 is a further code block diagram in accordance with an embodiment of the invention.

With reference to FIG. 2:

Data Type 16 contains a record for each type of data the client can process, e.g. INVOICE, ACCOUNTUPDATE.

When MIAC created API's are called, the system will look up the data type in Data Type 16 when it creates a task. This will tell it what Project 03 (FIG. 1) it belongs to and to whom to assign the task Usercode 08 (FIG. 1).

The system will then use the Data Type Next Action 19 table to determine what the next action is.

It will use the Data Type Notify 18 table to determine who should be notified which is established from 08,01 and unique ID #.

KeepTaskTime within 16 determines how long the task is kept once it's been closed. This will be set on the task and can be used by the auditing service to remove old data.

Show As Form Data with 16 indicates this data can be displayed as a form on the UI task page. The user will then be able to view/edit the details. For something like an INVOICE this may be checked off or where a sensor fault notification would be displayed. Form Layout within 16 contains the details of the form that will be displayed to the user.

User Selectable within 16 is set to Yes for items the user can manually select for a task. For something that needs processing, e.g. INVOICE, this would be No. By having User Selectable data types, the user can select an appropriate task from 09 (FIG. 1) and have the system determine the subsequent users and next action times for the task.

When a task is created for a specific data type, the system will use information from Data Type Project 20 to determine which project the task is assigned. Field Key and Field Test within 20 are used for testing, example the Postcode field with a value between 4000-4999 gets assigned to a specific project.

When a task is created for a specific data type, the system will use information from Data Type Usercode 17 to determine the user to whom the task is assigned. The Escalate Level within 17 allows different users to be assigned as the task is escalated. All tasks start at level 0. If a response is not received, the system will check for rules in 11 and 09 (FIG. 1) for EscalateLevel 1 and assign the task to that person. This can repeat as required and escalate the task to the highest level. This effectively moves the task up the chain of command.

The User Type within 17 determines if a specific user or a role has been assigned to a task. If we specify a role from 05 (FIG. 1), the system can look up the users on the project 10 (FIG. 1) who have that role to determine who should be assigned the task.

Priority within 17 allows the priority of a task 11 (FIG. 1) to be changed. If this priority is lower than the current priority the task is not changed. It will only change if this value is higher than the current priority.

Allowed Response Time within 17 is how long the user has to make a response. This would be along the lines of 'Am starting job' as a response.

The Allowed Action Time within 17 is how long the user has to complete the job. Example: a plumber may need to make a response within 10 minutes but has to complete the job within 2 hrs of making a response. This is simply setting the next action time, which the user could override via the UI (and which would be audited).

Data Type Notify 18 contains details of who should be notified when this type of data is processed and can specify notify details for success and error. Multiple users can be notified. If you don't set up any then no one will be notified. Each record is set with the type of user to be notified. This can be Assigned (the currently assigned user), User 08 (FIG. 1) (you set a specific user to receive the notification) or Role 05 (FIG. 1) (you set the role and the system will determine the user). The Escalate Level within 18 allows different users to be notified as the task is escalated due to lack of response.

Data Type Next Action 19 contains details of what the next action should be when a type of data is processed. Can specify different 'next action' attributes for success and error and where multiple actions can be performed. If no next action is set up in the UI then no action will be automatically performed.

The New Task property within 18 indicates if a new task should be created. You can only have one action marked as No (so that it just updates the current task). If you have multiple actions that can be performed, new tasks need to be created to perform the new actions.

The Required by Time field within 18 is a date/time field which indicates how much time is allowed for processing. This will be used to set the Next Action on the task 11 (FIG. 1).

The Task Data Id within 18 points to the data to use for this next action. If we had an INVOICE task present and the next action is ACCOUNTUPDATE, the Task Data in 18 would be the content of the data suitable for the accounts software to receive. The MIAC system determines the next action to be performed and place this in a queue. As each item is read from the queue, the system knows the current action and the next action and can take the appropriate action. There are also special pre-defined actions where MIAC, using 19 can escalate a task to a higher level which would be triggered by the scheduler if no response has been received by the required time or automatically close a task. Escalation.

When the task is assigned to a user, the system will set the Next Action time to a specific time. If the task is NOT processed by that time, an ESCALATE action will be scheduled. This will be picked up by the schedule. It will attempt to reassign the task. Note, you can repeatedly assign to the same person/role for a number of times before escalating further.

| Escalate level | Assigned to | Allowed Response Time (minutes) | Allowed Action Time (hours) |
|---|---|---|---|
| 0 | Worker | 10 | 2 |
| 1 | Worker | 10 | 2 |
| 2 | Supervisor | 5 | 2 |
| 3 | Boss | 2 | 10 |

If no records are recorded for a level higher than 0, the task cannot be escalated. It will just be a task that can be actioned as a normal type of task. If a task is under escalation control, when the assigned user makes a response, they should set the next action date and time. E.g. A plumber responds to a task within the allowed 20 minutes. The plumber says the job will take 2 hrs. The plumber sets that time. The task will not escalate again until that time is reached. The user cannot put the time forward any more than the Allowed Action Time. If Allowed ActionTime is 0, the user can adjust time as required.

FIG. 3

Figure 3:
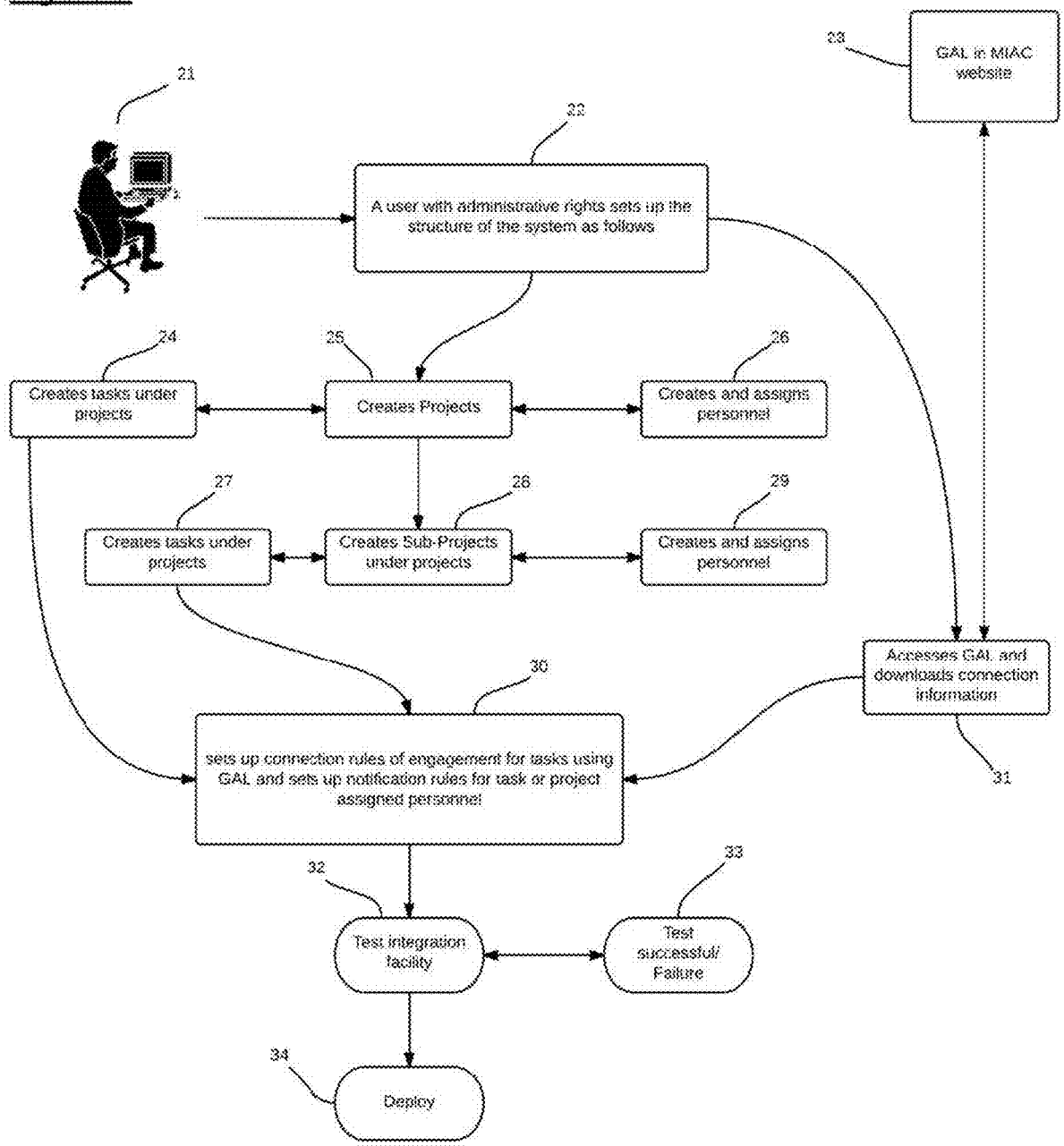
FIG. 3 is a flow chart of operation of the code in accordance with an embodiment of the invention.

FIG. 3 describes the user interface, creation of projects and tasks within the system and how the generic API library is accesses to create task functions and automation between unconnected systems.

FIG. 4

Figure 4:
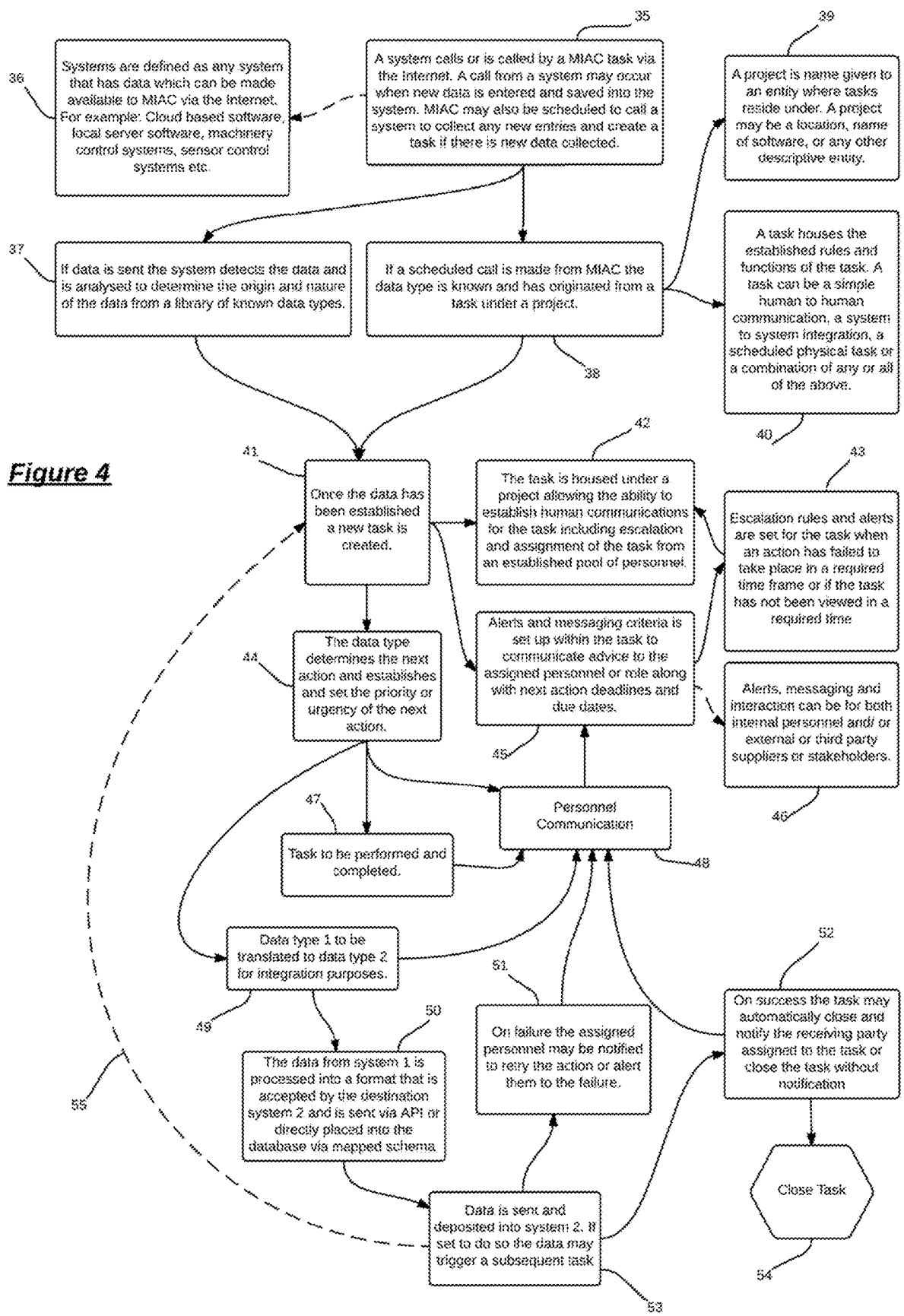
FIG. 4 is a flow chart of operation of the code in accordance with an embodiment of the invention.

FIG. 4 describes a typical work flow of the MIAC system after a project and task hierarchy has been established via the user interface. This diagram includes one of the possible task workflows including a preferred notification and alert system referencing the task and project data to complete the necessary actions.

FIG. 5

Figure 5:
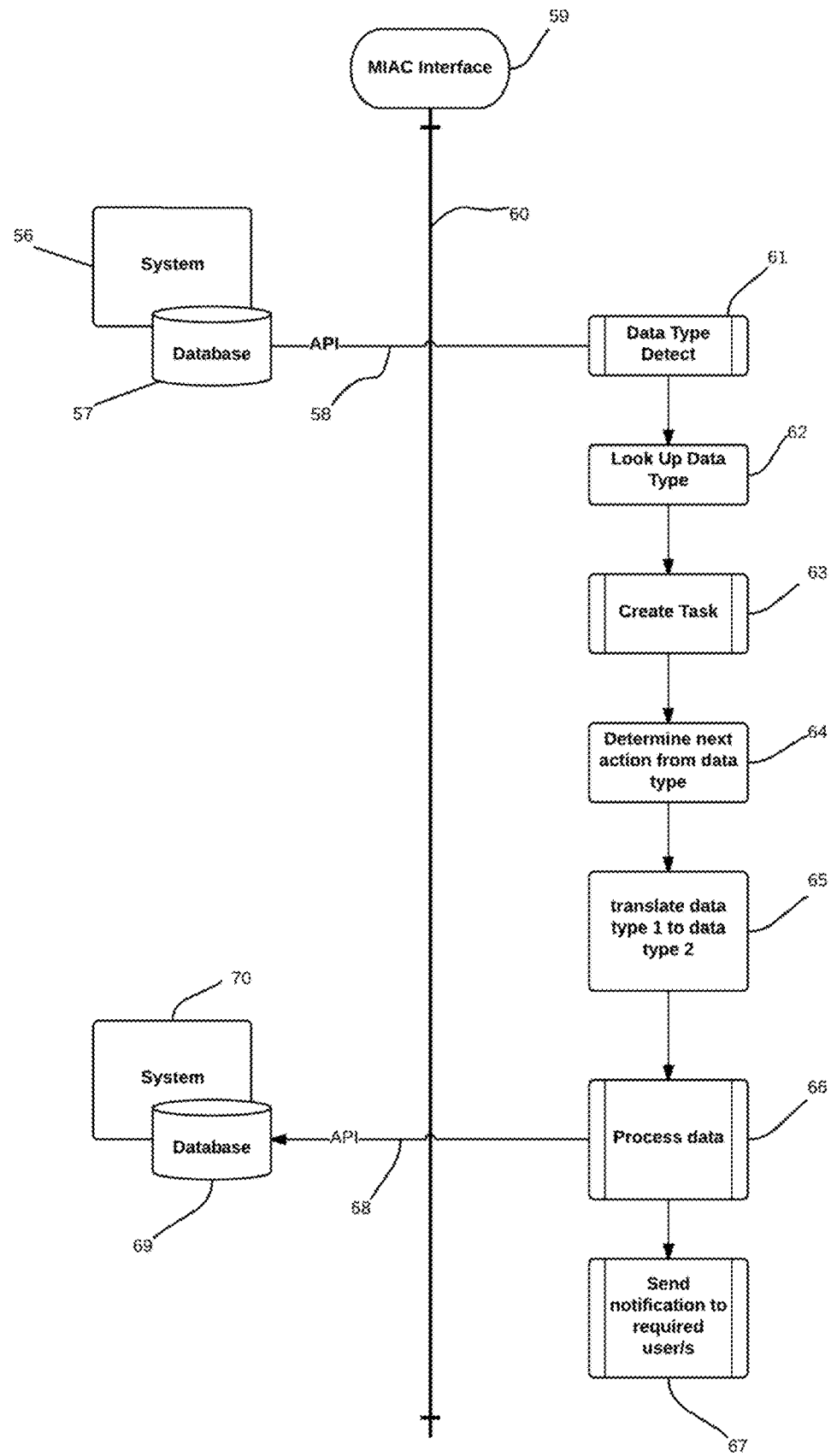
FIG. 5 is a function block diagram of the system in accordance with an embodiment of the invention.
Figure 6:
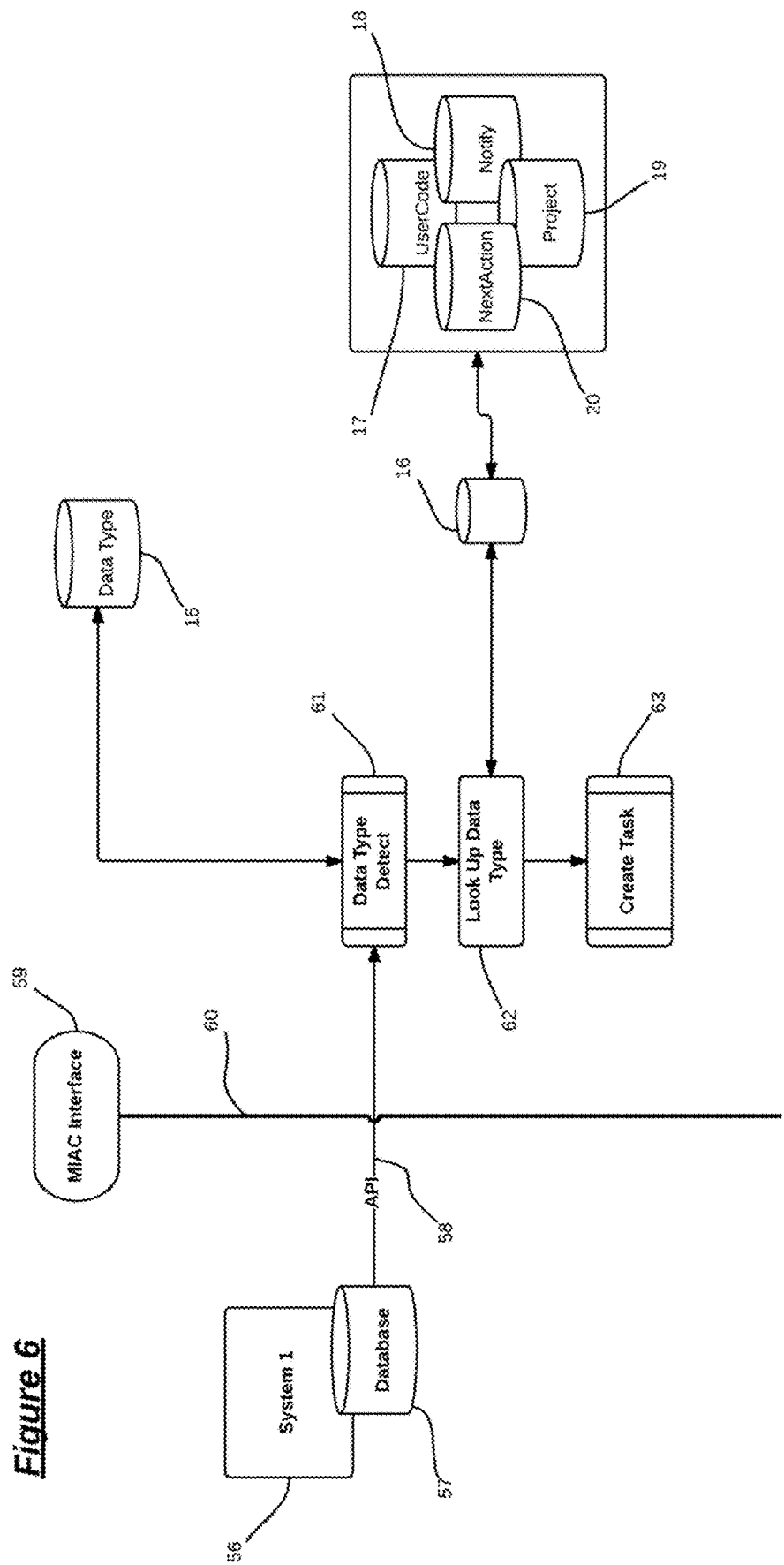
FIG. 6 is a function block diagram of the system in accordance with an embodiment of the invention.
Figure 7:
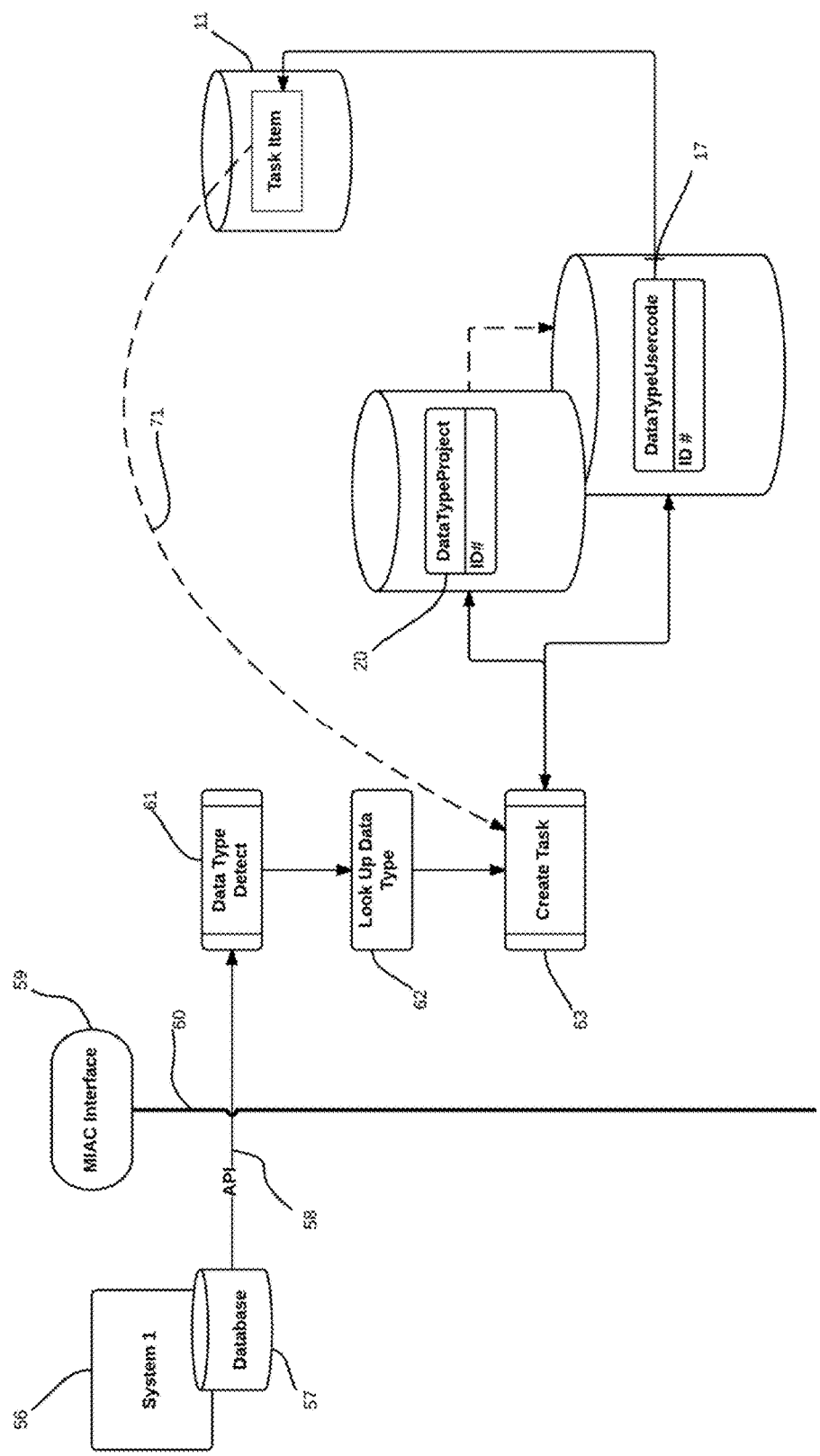
FIG. 7 is a function block diagram of the system in accordance with an embodiment of the invention.
Figure 8:
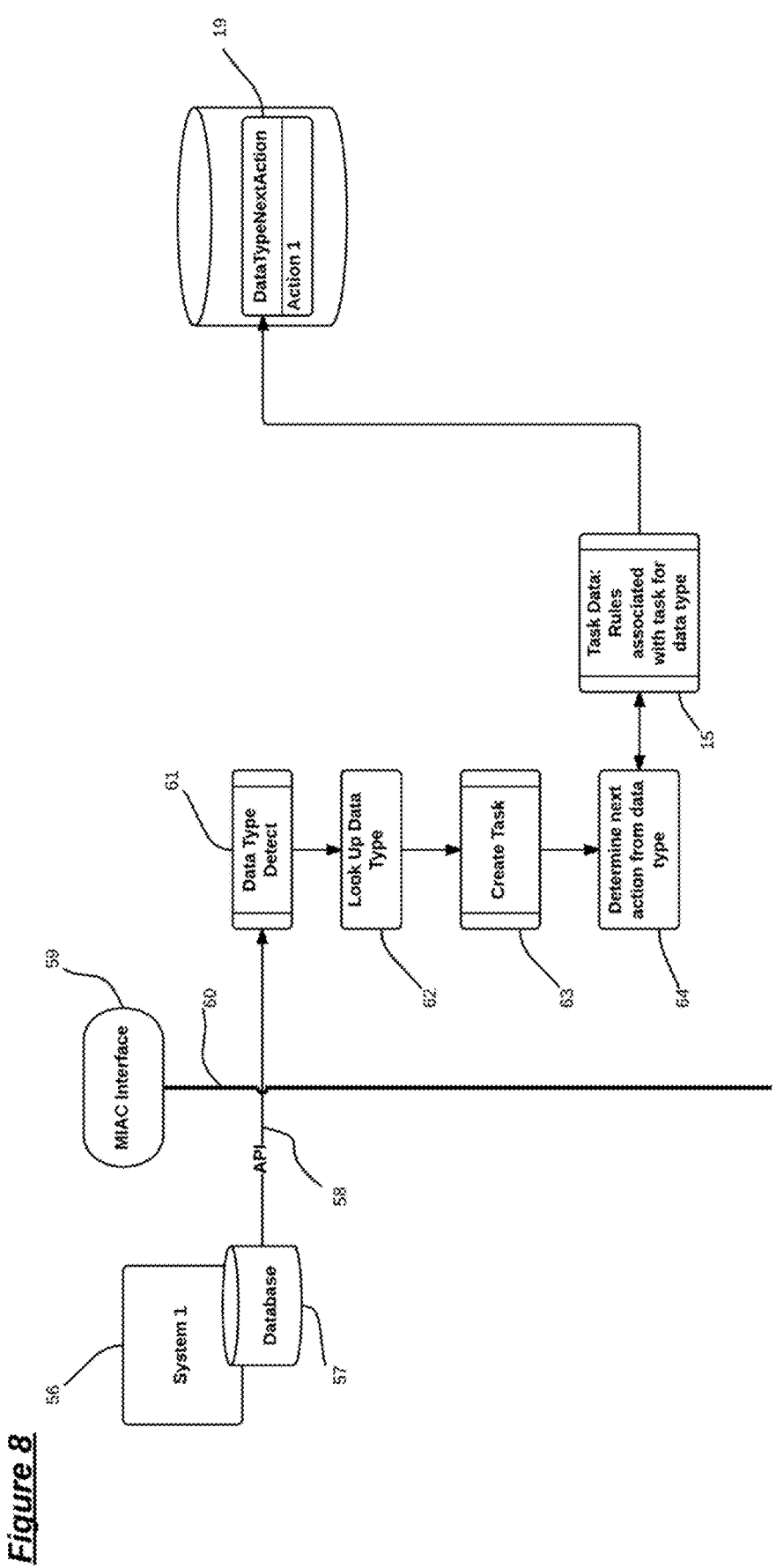
FIG. 8 is a function block diagram of the system in accordance with an embodiment of the invention.
Figure 9:
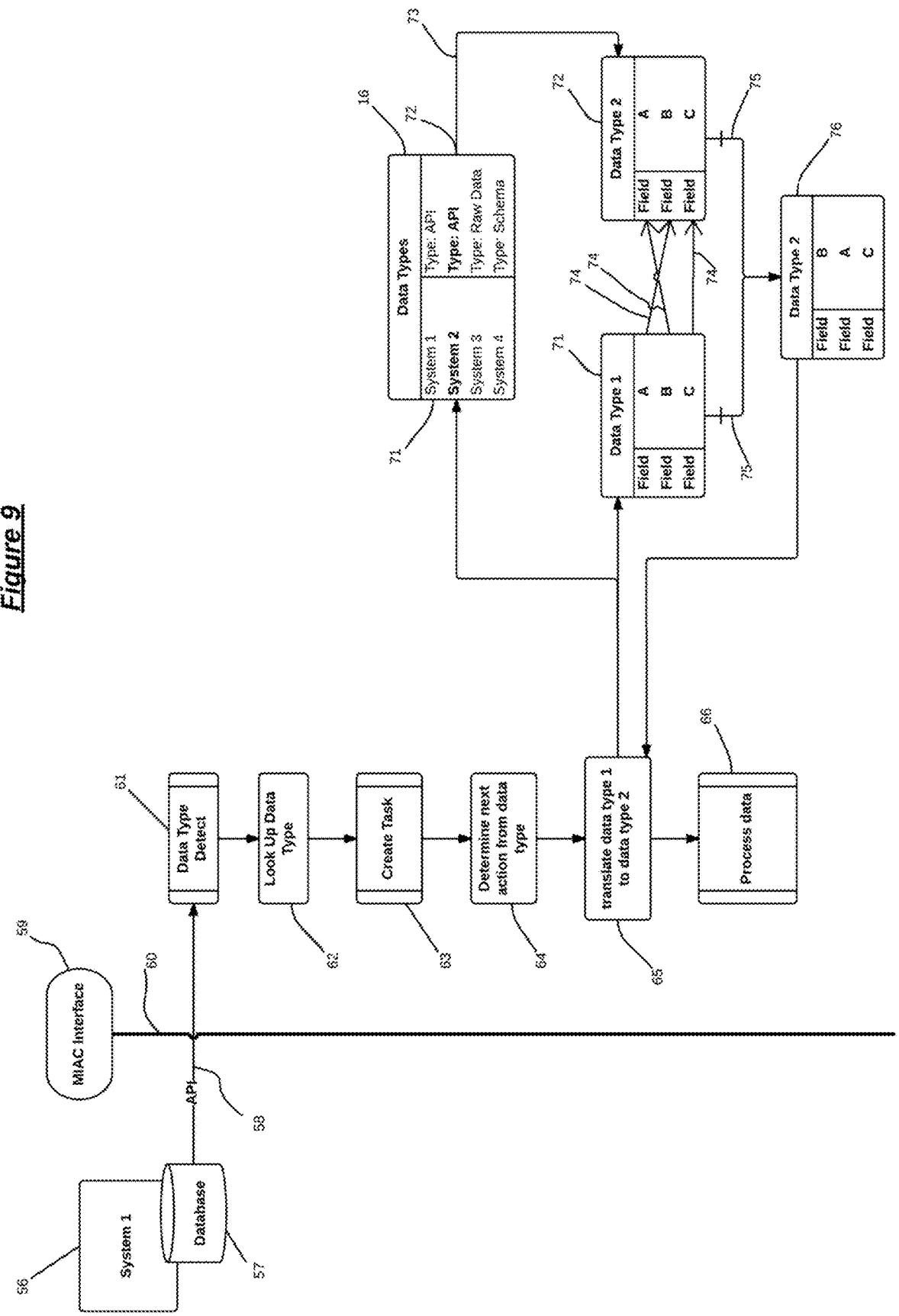
FIG. 9 is a function block diagram of the system in accordance with an embodiment of the invention.
Figure 10:
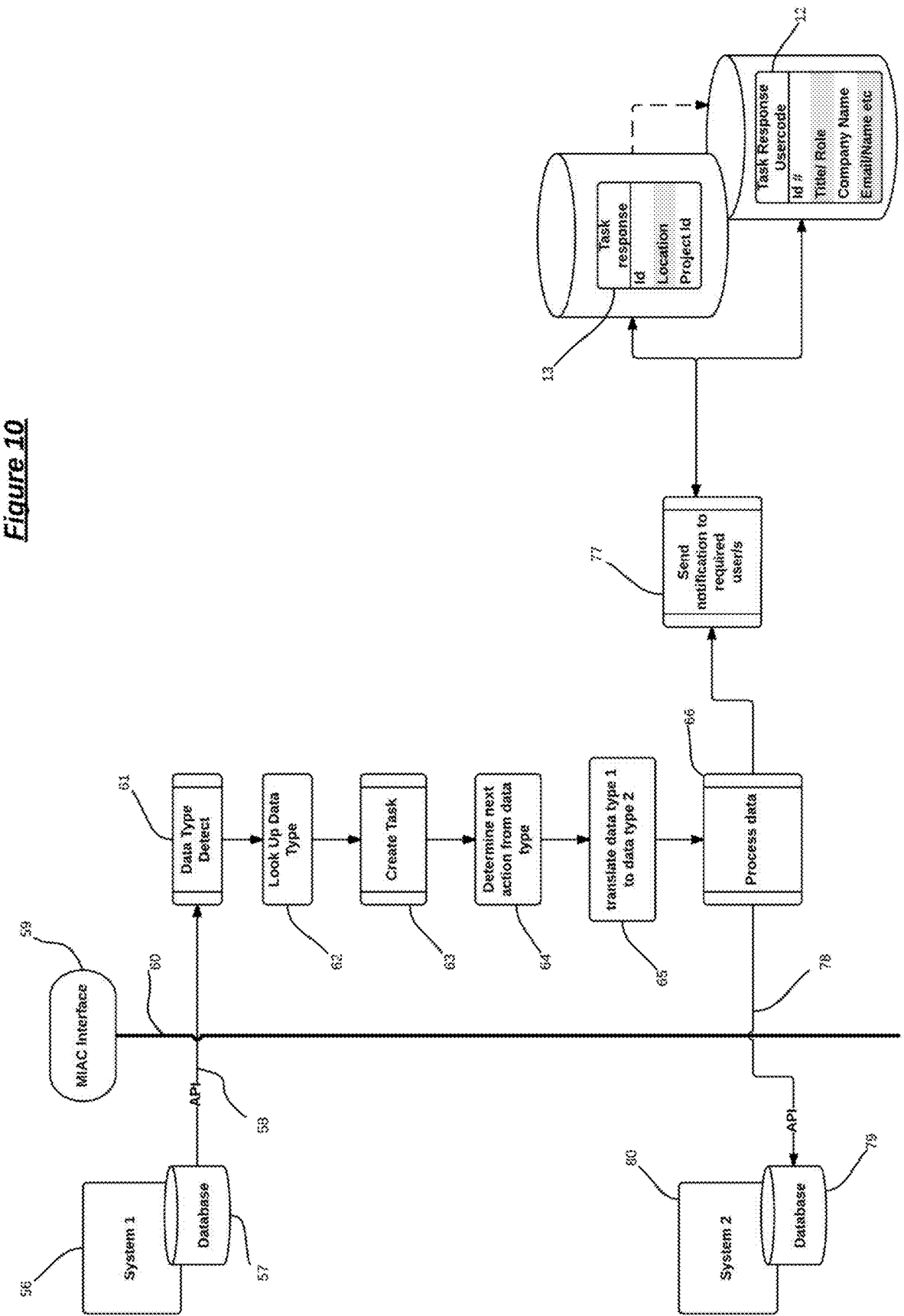
FIG. 10 is a function block diagram of the system in accordance with an embodiment of the invention.
Figure 11:
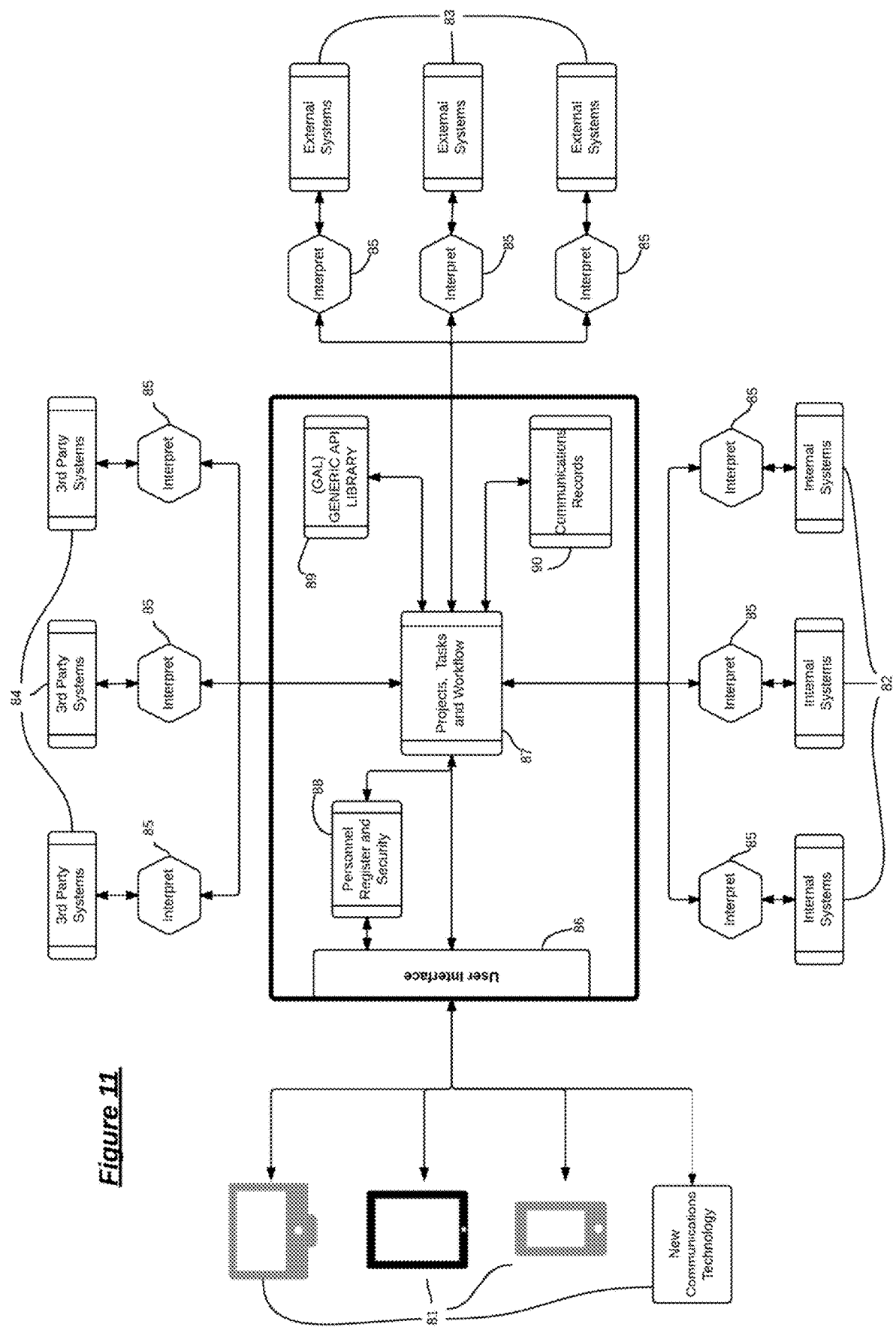
FIG. 11 is a function block diagram of the system in accordance with an embodiment of the invention.

FIG. 5 shows the basic flow of the system where system (56) has data entered from a source, manual or otherwise, and stored in its database, (57). This triggers its API (58) to call the MIAC system (59) and crosses the security firewall (60) to allow the interface with system (59). System (59) detects the data type from (56) when the API call is made and cross references the data with an API library (described in FIG. 6) to ascertain the origin of the API call (58). Using the result of the data detected in the cross reference (described in FIG. 6) the system then looks up the data (detailed in FIG. 6) and creates a new task (63) inside a project which related to the unique data detected (61) and applies a pre-determined a set of rules. The data type (62) determines the next action (64) which can be a range of actions discussed in later drawings. If the next action (64) is designed to send the data to another system (70) the next action then looks up the destination system in the API library (62) and (61) and the data fields are translated for destination system (70) as set by the rules placed via system (59) user interface and is housed in task (63). The data is then processed (66) for distribution to system (70) and sent via API (68) into database (69) into system (70). Along with the API to (68) a notifications are sent to internal personnel assigned to task (63) and or personnel from the origin software (56) if an action is detected and or to the destination software (70) for confirmation the failure or success of the data transaction (68) and to internal personnel assigned to task (63).

FIG. 6

Information of a certain type is placed into system (59) and triggers an API call (58) to MIAC (59) and enters the system through security (60). The data detected in (step 61) and is cross referenced in a database library (16) to obtain data, code, schema mappings or API structures for system 1 (56). Any given system (example FIG. 4) may have a single or multiple API's which will, after cross referencing with the library (16) data tables (17, 18, 19 and 20), will determine the destination of the data and place the data in a new task (63) for deployment. The range of actions are numerous and will be discussed later in the document.

FIG. 7

On creation of a task (63), the task houses a set of instructions created for the data type (56) with task information and rules of engagement obtained from data base (20 and 17) which then gathers the information required to create actions and applied rules from data base (11). This information triggers the action from (11) which is recorded in (63) and send messages and alerts to personnel by referencing data tables (20 and 17).

FIG. 8

System 1 (56) calls with API (58), MIAC detects the data type (61) looks up the data type (62) and creates task (63) a set of rules in task (63) are determined (64) which are pre-set by the user interface and are applied using data table (19). If a current task data link is present in (19) the rules associated with the task (63).

FIG. 9

Once a next action is determined where system data from (56, 57 and 58) is to be directed to populate another system and where the systems are typically different in language and code the API structure of (56) is already known (71) and the API structure of the destination system is set in the rules associated with task (63). The new data type is accessed through data types library (16) and is directed to data type (72). Translation of data type (71) to system 2, data type (72) are applied and placed into API data structure (76). The data is then processed by (66) and placed in a queue ready for deployment.

FIG. 10

The processed data in (66) is then sent via API (78) and is populated into database (79) for display by 'system 2' (80). At the same time custom and/or standardised notifications (77) are sent to the associated people on the task (63) using the project and user code databases (12 and 13) as explained in 'FIG. 3'.

FIG. 11

The display for users (81) can be accessed in a number of ways such as computer, tablet, mobile device or new technology designed to connect systems with people. This gives users access to a UI (user interface 86). The personnel register within the system grants access privileges to (88) to the user and allows them to access the Project, task and workflow area (87) to interact and become a part of the notification system within (87). API data is located within the GAL (89) where integration information for connected systems reside. Communications records (90) houses the information collected by (87) and other interactions from personnel (88). It is displayed in user interface (86) after confirming with security access in (88). Interpreter boxes (85) are located in different environments such a cloud based services, onsite servers etc. where data is interpreted to be populated with other software. The transformed data is detected by (87) and using the rules set within (87) deploys the data into another piece of software. This means that internal software (82) may be coupled in a workflow with other software pool from (82, 83 and 84) in any manner that mirrors an existing or intended task or workflow as set in (87). As process occur the data inputs and actions from (82, 83 and 84) are recorded, along with any other communications from users using (86) into a chronological manner in the communications and records (90) are of the system. Each action or communication is recorded with a personnel name, system identifier, time and date stamp for continuity and or audit purpose which is displayed in user interface (86)

Figure 12:
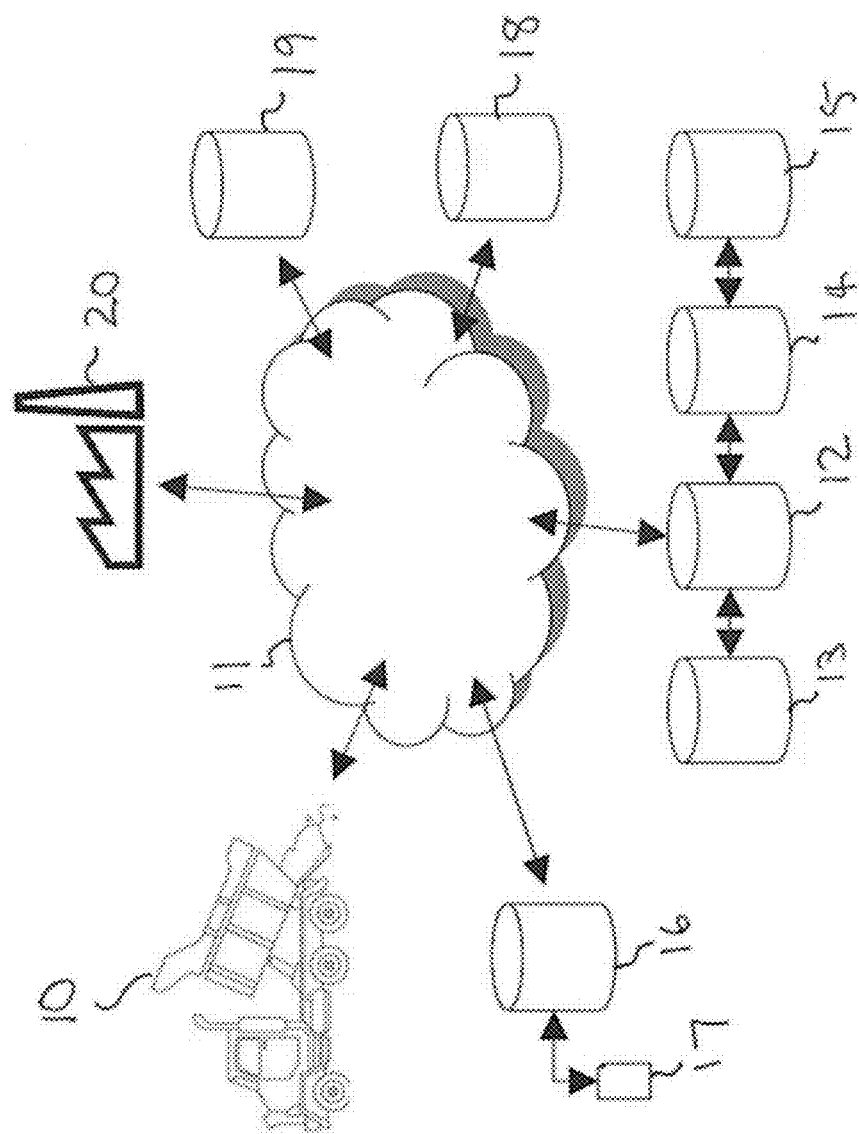
FIG. 12 is a function block diagram of the system in accordance with a further embodiment of the invention.

Stated Another Way:

FIG. 12 discloses the key components of the example embodiment. A computerized on-board Vehicle maintenance system (110) that is known in the art, may be connected Wirelessly over the Internet (111) to an Automation Control System (112) that is running a process including forms (114), rules of action for those forms (115) and a library of API interpreters (113).

This interpreter library (113) is used to understand and interact with the proprietary API's available from the on-board Vehicle maintenance system (110) so that other systems integrated with the process (116,112,118,119,120) can easily understand and interact with it (110).

For example, if the truck maintenance system (110) detected a failing part, it could send a message to the automation control process (112) where the interpreted (113) communication from the truck (110) requires a number of related actions.

In this case a maintenance system (118) may need to be consulted to obtain information about the failing part that has been notified by the on-board truck maintenance system (110).

The maintenance system may require immediate replacement of the failing part or the shutdown of use of the Vehicle (110). The control system may then query the maintenance system (118) to see if the failed part is available for replacement and installation.

If not, then the control system (112), using forms (114) and rules (115) determines that the operating companies accounts system (119) be consulted to obtain a purchase order for the required part.

A connected part manufacturing service system (120) can be requested to produce and deliver the required part using the purchase order data from the company's accounts system (119).

The control process (112) then uses delivery information provided by the part manufacturing system (120) to instruct the truck management system (116) to take the truck (110) off the road until the new part can be installed.

The above process involves at least five different applications or services, each with its own API and proprietary set of calls and functions. The API interpretation modules (113) written for each application or service allow each system (112,116,118,119,120) to talk to each other in a common API language.

A set of forms (114) associated with processes and with specific application types uses a database of related rules (115) to make decisions and take steps that allow the smooth, reliable, fast and predictable operation of complex integrated systems.

Figure 13:
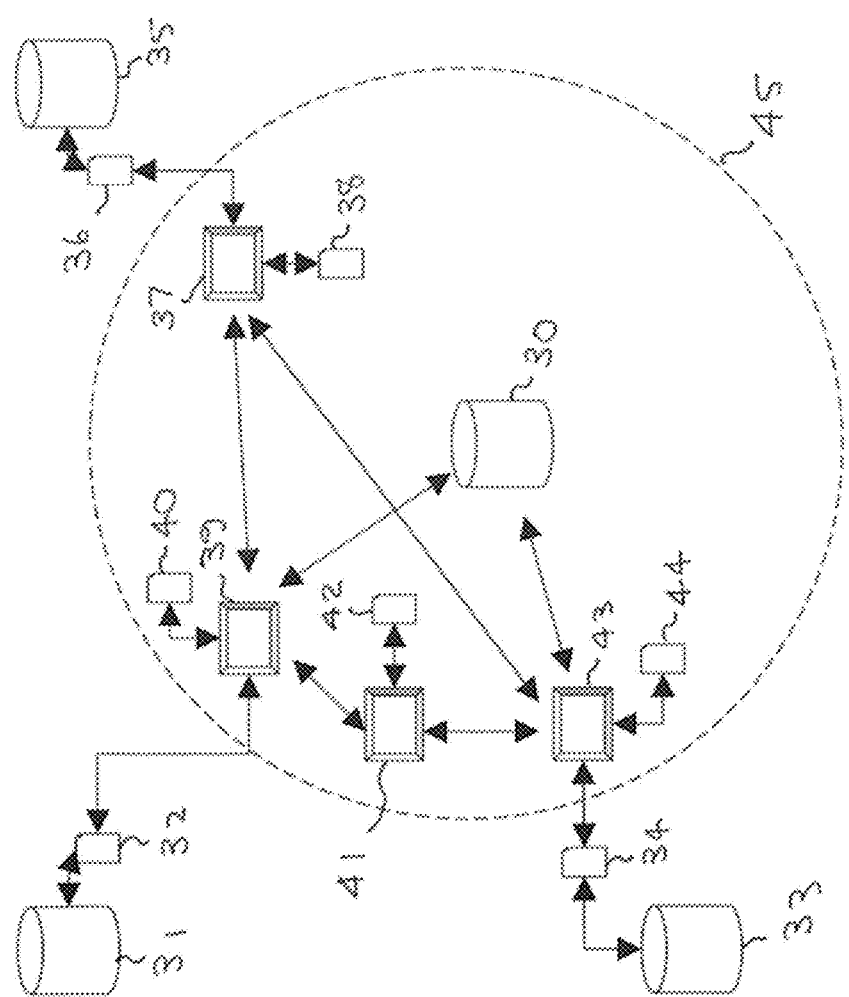
FIG. 13 is a function block diagram of the system in accordance with the further embodiment of FIG. 12.

FIG. 13 shows an architectural view of the example embodiment. An integrated system (145) is attached to multiple connected applications or services (131,133,135) with a wide range of capability and data stores. Each application or service (131,133,135) may have its own set of proprietary calls and functions that typically would have to be understood and integrated each time to allow system integration.

However, in this case each application or service has an associated API interpreter (132,134,136) that converts the proprietary API calls of each application or service into standardized system wide API calls that can be easily understood by all other components of the integrated system (45). After interpretation of the API calls and functions, forms (143,141,139,137) can be used along with related rules (144,142,140,138) to enable complex interactions to be executed.

A feature of the example embodiment is that the interaction between forms and rules does not necessarily require interaction with the master control process (130). A master system (130) may be used to initially start the integrated system process and or to handle exception situations where forms and rules are not able to handle a specific situation. In a case like this, human intervention may be required to resolve the issue at hand or to introduce a new form or rule to handle the unforeseen circumstance.

It may also be noted that in some cases the connected service or application may not have full interactive capability. For example, a service may only output data and not have the ability to receive commands from the integrated system control process or other forms. In this case the form and rules associated with that application are written to accommodate and manage that limitation.

Alternative Embodiments

The example embodiment of FIG. 12 shows a scenario of a broken part in a truck being handled by an integrated system. An alternative embodiment could be applied to solving any problem involving an integrated system and using any combination of applications, services, API calls and functions.

The example embodiment in FIG. 12 shows API interpretation modules that are associated with a variety of proprietary applications and services and where the interpretation modules are stored with the control system. An alternative embodiment could have the API interpretation modules at any location between the application and the other parts of the integrated system.

The invention claimed is:

1. A communications matrix network comprising:
a user interface;
   a memory device configured to contain an executable program;
   a processor connected to the user interface and the memory device, wherein the processor executes the executable program configured to perform the following steps:
      creating, with the processor, projects and a plurality of tasks,
      setting up, with the processor, processes within at least one task from the plurality of tasks,
      inviting and disabling, with the processor, personnel accounts,
      setting, with the processor, security for personnel,
      assigning, with the processor, access rights and privileges to individual accounts,
      accessing, with the processor, a generic API library for integrating software,
   wherein the user interface enables the processor to execute user-input instructions whereby the projects, child projects and the plurality of tasks are set as a tree structure for intuitive system building;
   wherein said processor is further configured to execute a first set of user-input instructions whereby processes within the plurality of tasks are simplified by giving an administrator or approved personnel an ability through the user interface to create a single or set of forms to deploy through a second task from the plurality of tasks to the personnel to facilitate individualized procedures and processes;
   wherein the processor is further configured to execute a second set of user-input instructions whereby the security for the personnel is set individually or by role and wherein by setting a role-based security the user interface applies a global set of rules over roles where read/write, edit and viewing capabilities are set; and
   wherein the communications matrix network is configured to connect and combine communications between software as a service web services, bespoke on-site software services, operational technology services, web connected sensors, and personnel communication devices on a central platform, wherein administrators, through the communications matrix network, access the generic API library and download a known API to use for integration with another known product; and
   wherein the generic API library further comprises a stored set of all API structures and known integrations accessible for subsequent integrations through the user interface and wherein the user interface allows a person with the security for the personnel to access the generic API library and choose an API, raw data sensor actions or, mapped database schema from a list of available products and places available data fields into a column designated as an origin system and wherein API data fields are listed and placed in separate text fields; and
   wherein all data exchange is retained within the plurality of tasks; and
   the communications matrix network further comprising a plurality of actions, wherein one action of the plurality of actions may trigger another action of the plurality of actions within the plurality of tasks and where the plurality of actions are listed in sequence as a breadcrumb view to provide process timeline feedback to a user; and wherein limits are set for each action thereby allowing both automated data exchanges and manual human actions to be a part of a single workflow within at least one of the plurality of tasks.

2. The communication network matrix of claim 1, wherein the processor executes the executable program to perform the further step of accessing a success factor of the plurality of tasks.

3. The communication network matrix of claim 1, wherein the tree structure defines a hierarchical chain of command for the plurality of tasks.

4. A method for intuitive system building comprising:
   accessing a processor through a user interface to execute a program, wherein the program is stored on a memory device connected to the processor;
   creating, with the processor, projects and a plurality of tasks,
   setting up, with the processor, processes within a first task from the plurality of tasks,
   inviting and disabling, with the processor, personnel accounts,
   setting, with the processor, security for personnel,
   assigning, with the processor, access rights and privileges to individual accounts, and
   accessing a generic API library for integrating software,
   executing instructions through the processor whereby the projects, child projects and the plurality of tasks are set as a tree structure for intuitive system building;
   executing the instructions through the processor whereby processes within the plurality of tasks are simplified by giving an administrator or approved personnel an ability through the user interface to create a single or set of forms to deploy through a second task from the plurality of tasks to the personnel to facilitate individualized procedures and processes;
   executing the instructions through the processor whereby the security for the personnel is set individually or by role and wherein by setting a role-based security the user interface applies a global set of rules over roles where read/write, edit and viewing capabilities are set; and
   connecting and combining, using a communications matrix network, communications between software as a service web services, bespoke on-site software services, operational technology services, web connected sensors, and personnel communication devices on a central platform, and accessing, through the communications matrix network, the generic API library and downloading a known API to use for integration with another known product; and
   wherein the generic API library further comprises a stored set of all API structures and known integrations accessible for subsequent integrations through the user interface; and accessing the generic API library by a person with the security for personnel, the method further comprising choosing an API, raw data sensor actions or, mapped database schema from a list of available products and places available data fields into a column designated as an origin system and wherein API data fields are listed and placed in separate text fields; and wherein all data exchange is retained within the plurality of tasks;

triggering one action with another action within the plurality of tasks; and listing actions in sequence as a breadcrumb view to provide process timeline feedback to a user; and setting limits for each action thereby allowing both automated data exchanges and manual human actions to be a part of a single workflow within at least one task from the plurality of tasks.

* * * * *